(12) United States Patent
Maruhashi et al.

(10) Patent No.: US 8,732,117 B2
(45) Date of Patent: May 20, 2014

(54) INFORMATION PROCESSING APPARATUS AND ELEMENT EXTRACTION METHOD

(75) Inventors: Koji Maruhashi, Hachioji (JP); Nobuhiro Yugami, Minato (JP)

(73) Assignee: Fujitsu Limited, Kawasaki (JP)

( * ) Notice: Subject to any disclaimer, the term of this patent is extended or adjusted under 35 U.S.C. 154(b) by 6 days.

(21) Appl. No.: 13/588,285

(22) Filed: Aug. 17, 2012

(65) Prior Publication Data

US 2013/0066827 A1    Mar. 14, 2013

(30) Foreign Application Priority Data

Sep. 9, 2011    (JP) .................................. 2011-197085

(51) Int. Cl.
*G06F 17/30*    (2006.01)

(52) U.S. Cl.
USPC ......................................................... 707/602

(58) Field of Classification Search
USPC ................... 707/2, 3, 737, 602; 709/204–206
See application file for complete search history.

(56) References Cited

U.S. PATENT DOCUMENTS

2005/0108168 A1*   5/2005   Halpin et al. .................... 705/45
2009/0150244 A1*   6/2009   Ciancio et al. .................. 705/14

FOREIGN PATENT DOCUMENTS

WO    WO-2006/057105    6/2006

OTHER PUBLICATIONS

J. Hopcroft, et al., "Efficient Algorithms for Graph Manipulation", Communications of the ACM, vol. 16, No. 6, pp. 372-378 (Jun. 1973).

* cited by examiner

*Primary Examiner* — Etienne Leroux
(74) *Attorney, Agent, or Firm* — Fujitsu Patent Center

(57) ABSTRACT

In an information processing apparatus, a first deletion unit deletes, from sets stored in a storage unit, sets having less than a threshold number of included elements and elements existing in only sets whose number is less than a threshold number of occurrences. A grouping unit generates a group of sets associated with each other in terms of commonality of elements out of the sets remaining in the storage unit. A second deletion unit deletes, with respect to each generated group, sets having less than the threshold number of included elements and elements existing in only sets whose number is less than the threshold number of occurrences, from the sets belonging to the group. An output unit outputs a list of elements included in the sets remaining in each group where there are no sets or elements that need to be deleted.

7 Claims, 17 Drawing Sheets

INFORMATION PROCESSING APPARATUS AND ELEMENT EXTRACTION METHOD

CROSS-REFERENCE TO RELATED APPLICATION

This application is based upon and claims the benefit of priority of the prior Japanese Patent Application No. 2011-197085, filed on Sep. 9, 2011, the entire contents of which are incorporated herein by reference.

FIELD

The embodiments discussed herein relate to an information processing apparatus and an element extraction method.

BACKGROUND

Broadening the range of use of Information and Communication Technology (ICT) enables collection of various information. By performing, for example, data mining on the collected information, useful knowledge is able to be extracted.

One example of information to be collected with the ICT is information (transaction data) on product-related transactions (trading). For example, transaction data indicating items that a customer purchased at a one-time shopping is acquired via a Point Of Sales (POS) system. In this case, the transaction data is a data set that indicates a subset of all items handled by a shop.

When such transaction data is collected, a set of items which are included together (co-occur) in many pieces of transaction data may be extracted as knowledge. In this case, the set of items may be extracted under the predetermined extraction conditions which include not only whether the items are included together in many pieces of transaction data but also other various kinds of information.

The simplest way to extract a set of items satisfying predetermined conditions from data sets that are transactions each indicating a subset of all items is to confirm whether every different combination of items satisfies extraction conditions or not, and extract combinations of items satisfying the extraction conditions. However, this method has problems in which a larger number of items increase the number of combinations of items and thus considerable computational complexity is needed.

To cope with this problem, there are a variety of techniques to streamline a process for extracting a set of items under item set extraction conditions. For example, there has been proposed a symbol and numeric value basket analysis method for easily and accurately performing numeric value quantitative analysis of event occurrence relationship by searching a large number of transactions including symbol items and numeric value items. In addition, there also have been proposed efficient algorithms for graph manipulation as a technique to improve process efficiency. For example, please refer to International Publication Pamphlet No. WO 2006/057105, and J. Hoperoft, R. Tarjan, "*Efficient algorithms for graph manipulation*", Communications of the ACM Volume 16 Issue 6, June 1973, p. 372-378.

However, there has been no technique to streamline a process for extracting a set of items that are included together in many of transactions collected in terms of commonality of items. Such a set of items, which are included together in many of transactions collected in terms of commonality of items, is usable for obtaining the following knowledge.

For example, from transactions indicating items ordered by customers at a restaurant, transactions are collected in terms of commonality of items. Then, from the collected transactions, a set of items that are included together in many of the transactions is extracted. A menu listing the items indicated by thus extracted set of items is a menu that covers items that are likely to be ordered together by many customers who have similar tastes. Therefore, such a menu is user friendly for many customers who have similar tastes.

In this connection, knowledge that is obtained from a set of items included together in many of transactions collected in terms of commonality of items is not limited to knowledge regarding items to be listed in a menu for a restaurant. For example, such knowledge is useful for product retail stores to determine what products are to be arranged on one shelf. In addition, such techniques using data mining to streamline a process of obtaining knowledge are generally useful techniques not only for obtaining knowledge based on transactions but also for obtaining knowledge based on a set of elements that are various kinds of information.

SUMMARY

According to an aspect, there is provided an information processing apparatus including a processor configured to perform a procedure that includes: deleting, from a plurality of sets each including at least one element and stored in a storage unit, a set having less than a threshold number of included elements and an element existing in only sets whose number is less than a threshold number of occurrences; generating, out of sets remaining in the storage unit after the deleting of the set and element, a group to which sets associated with each other in terms of commonality of elements belong; deleting, with respect to each of generated groups stored in the storage unit, a set having less than the threshold number of included elements and an element existing in only sets whose number is less than the threshold number of occurrences, from the sets belonging to said each group; and outputting a list of elements included in sets remaining in said each group subjected to the deleting of the set and element.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
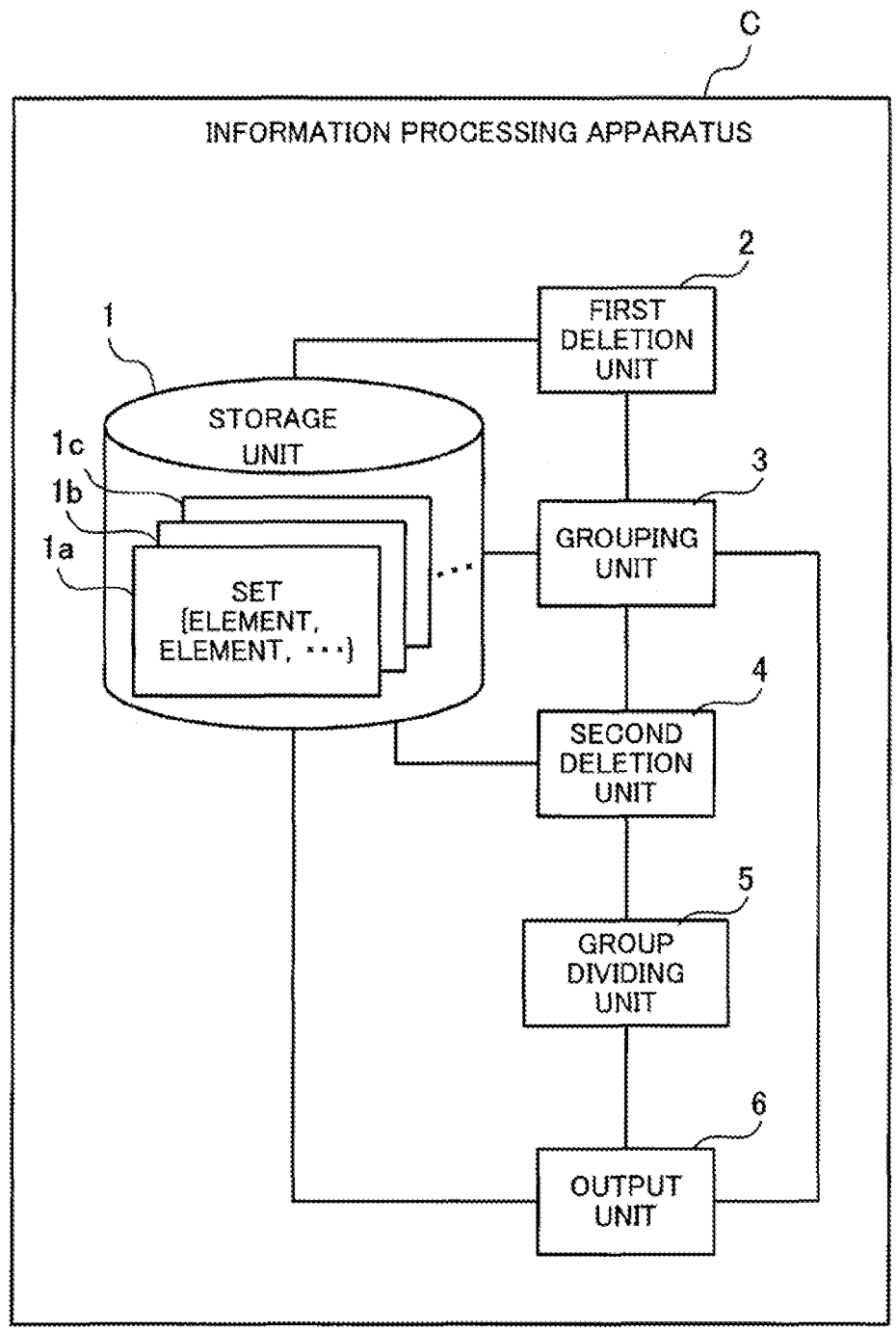
FIG. 1 illustrates an exemplary functional configuration of an apparatus according to a first embodiment.

Several embodiments will be described below with reference to the accompanying drawings, wherein like reference numerals refer to like elements throughout. Where appropriate, two or more components and features provided in the embodiments may be combined.

(A) First Embodiment

In a first embodiment, the following extraction conditions are defined for extracting a set of elements that are included together in many of a plurality of sets associated with each other in terms of commonality of elements.

(First Element Extraction Conditions)

With respect to each of a plurality of elements to be extracted, the number of sets including the element is equal to or greater than a threshold number of occurrences, these sets including the element belong to one group of a plurality of sets, and each set belonging to the group includes at least a threshold number of included elements out of the plurality of elements to be extracted.

(Second Element Extraction Conditions)

A plurality of sets belonging to a group satisfying the first element extraction conditions on extraction of a plurality of elements is a collection of sets having associations, which are associated with each other in terms of having in common at least a threshold number of common elements out of the plurality of elements to be extracted.

The following describes functions for extracting a plurality of elements satisfying the above first and second element extraction conditions.

FIG. 1 illustrates an exemplary functional configuration of an apparatus according to the first embodiment. An information processing apparatus C includes a storage unit 1, first deletion unit 2, grouping unit 3, second deletion unit 4, group dividing unit 5, and output unit 6.

The storage unit 1 stores a plurality of sets 1a, 1b, and 1c each including at least one element.

The first deletion unit 2 repeatedly deletes, from the storage unit 1, a set having less than a threshold number of included elements and an element existing in only sets whose number is less than a threshold number of occurrences until there is no more such a set or element that needs to be deleted.

The grouping unit 3 generates a group of sets associated with each other in terms of commonality of elements out of the sets remaining in the storage unit 1 after the deletion of sets and elements. For example, the grouping unit 3 associates sets having in common at least a threshold number of common elements with each other out of the sets remaining in the storage unit 1 where there are no sets or elements that need to be deleted, and generates a group to which a plurality of linked sets obtained by tracking the associated sets belong.

The second deletion unit 4 performs a set and element deletion process for each generated group. For example, with respect to the sets belonging to each group in the storage unit 1, the second deletion unit 4 deletes a set having less than the threshold number of included elements and an element existing in only sets whose number is less than the threshold number of occurrences out of the sets belonging to the group. The second deletion unit 4 repeats this set and element deletion process until there is no more such a set or element that needs to be deleted.

With respect to each of the groups subjected to the deletion of sets and elements, the group dividing unit 5 associates sets with each other in terms of commonality of elements out of the sets remaining in the group. In the case where a plurality of sets associated with each other forms part of the sets remaining in the group, the group dividing unit 5 generates another group to which the plurality of associated sets belongs. For example, the group dividing unit 5 associates sets having in common at least the threshold number of common elements with each other out of the sets remaining in the group subjected to the deletion of sets and element, and obtains a plurality of linked sets by tracking the associated sets. In the case where the obtained plurality of linked sets forms part of the sets belonging to the original group, the group dividing unit 5 generates another group to which the obtained plurality of linked sets belongs.

The output unit 6 outputs a list of elements included in the sets remaining in each group subjected to the deletion of sets and elements. For example, if another group is not separated from a group subjected to the deletion of sets and elements, the output unit 6 outputs a list of elements included in the sets belonging to the group subjected to the deletion of sets and elements.

In this connection, the first deletion unit 2, grouping unit 3, second deletion unit 4, group dividing unit 5, and output unit 6 are implemented by a Central Processing Unit (CPU) provided in the information processing apparatus C. In addition, the storage unit 1 is implemented by using a Random Access Memory (RAM) or Hard Disk Drive (HDD) provided in the information processing apparatus C.

In addition, lines connecting between functions illustrated in FIG. 1 represent communication paths, and other communication paths may be set.

Figure 2:
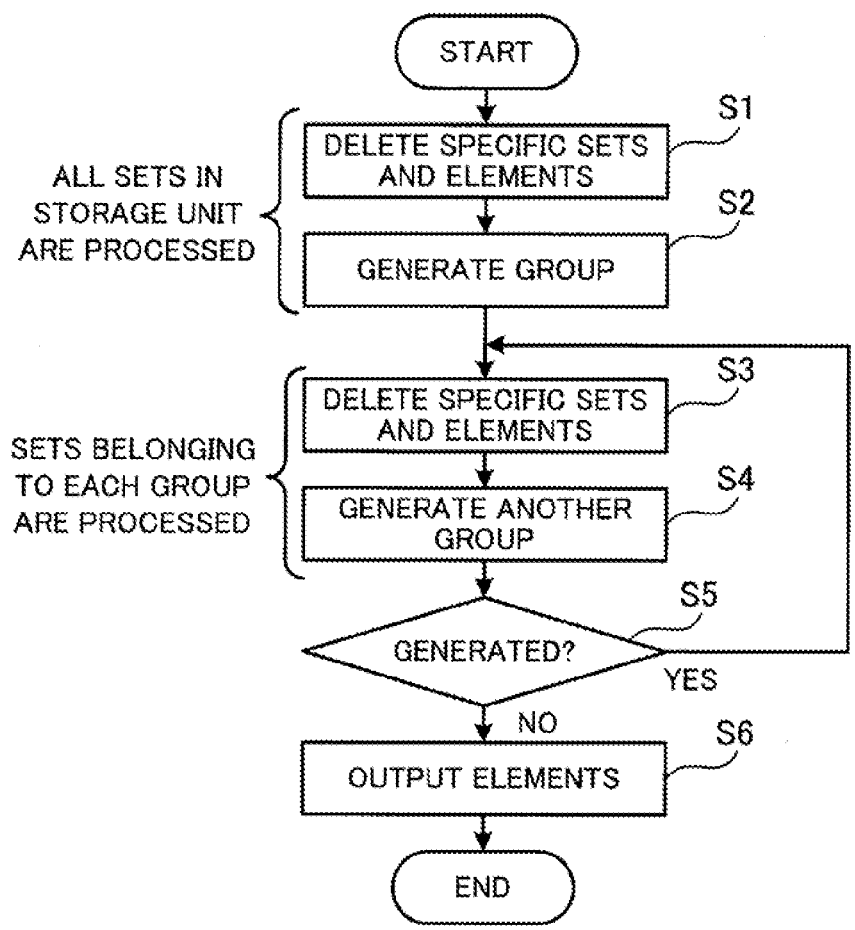
FIG. 2 is a flowchart illustrating an exemplary element list output process according to the first embodiment.

FIG. 2 is a flowchart illustrating an exemplary element list output process according to the first embodiment. This process will be described step by step. For example, the following process is initiated in response to input of an execution instruction from a user.

At step S1, the first deletion unit 2 processes all of the sets 1a, 1b, 1c, . . . in the storage unit 1 in order to delete sets and elements satisfying predetermined deletion conditions. For example, the first deletion unit 2 deletes, from the storage unit 1, a set having less than a threshold number of included elements and an element existing in only sets whose number is less than a threshold number of occurrences until there is no more such a set or element that needs to be deleted.

At step S2, the grouping unit 3 generates a group of a plurality of sets out of the sets remaining in the storage unit 1. For example, the grouping unit 3 associates sets having in common at least a threshold number of common elements with each other out of the sets remaining in the storage unit 1 where there are no sets or elements that need to be deleted, and generates a group to which a plurality of linked sets obtained by tracking the associated sets belongs.

At step S3, the second deletion unit 4 processes the sets belonging to the group generated at step S2 in order to delete sets and elements satisfying the predetermined deletion conditions. For example, with respect to the sets belonging to a group in the storage unit 1, the second deletion unit 4 deletes a set having less than the threshold number of included elements and an element existing in only sets whose number is less than the threshold number of occurrences, from the sets belonging to the group. The second deletion unit 4 repeats this set and element deletion process until there is no more such a set or element that needs to be deleted.

At step S4, the group dividing unit 5 generates another group from each group where there are no sets or elements that need to be deleted. For example, the group dividing unit 5 associates sets having in common at least the threshold number of common elements with each other out of the sets remaining in an existing group, and obtains a plurality of linked sets by tracking the associated sets. In the case where the obtained plurality of linked sets forms part of the sets belonging to the original group, the group dividing unit 5 then generates another group to which the obtained plurality of linked sets belongs.

At step S5, the output unit 6 determines whether another group was generated at step S4 or not. If another group was generated, the process proceeds to step S3. Otherwise, the process proceeds to step S6.

At step S6, the output unit 6 outputs a list of elements included in any of the sets remaining in each of the generated groups.

As described above, a plurality of elements satisfying the above-described first and second conditions is extracted.

Figure 3:
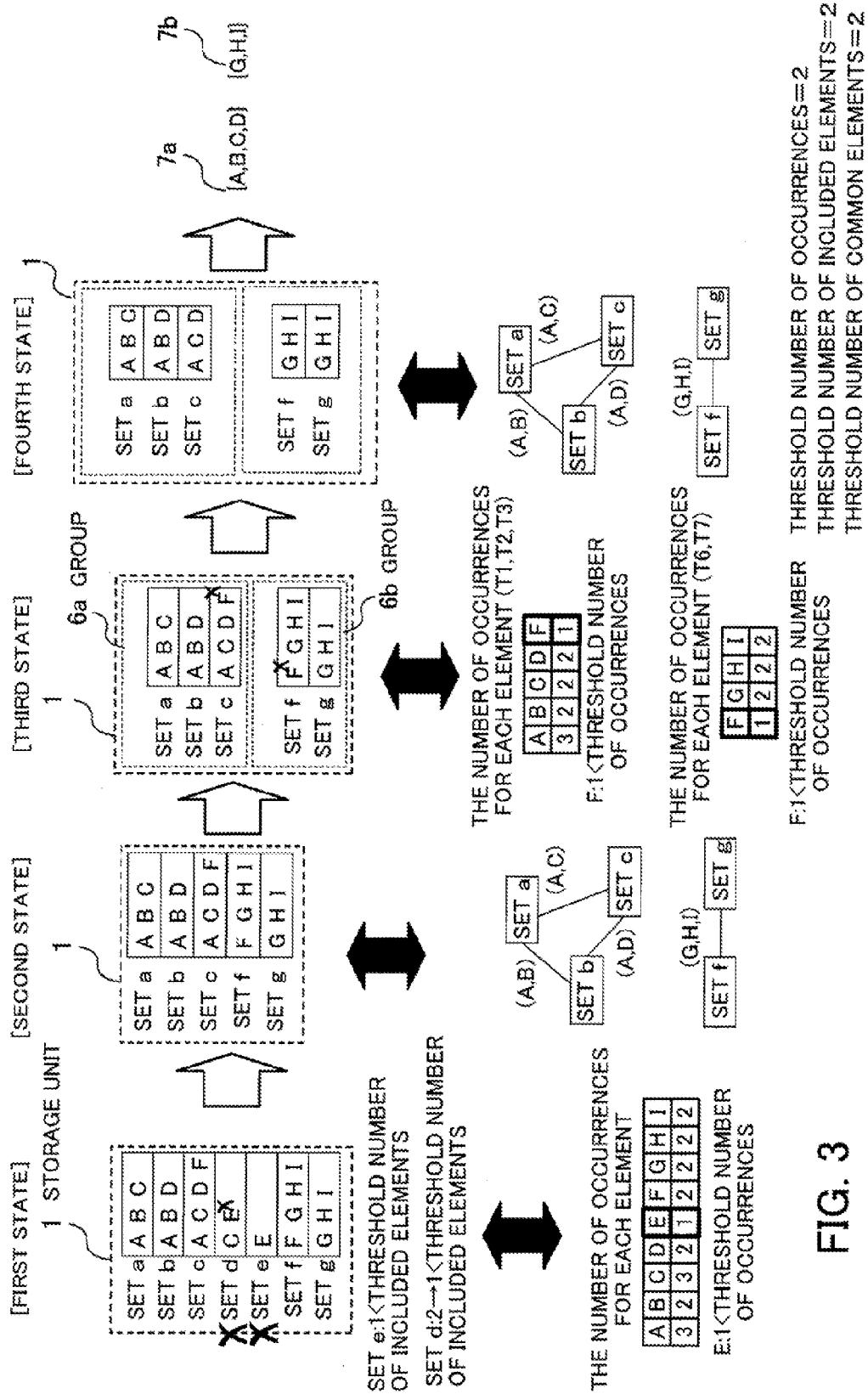
FIG. 3 illustrates an example of extraction of elements according to the first embodiment.

FIG. 3 illustrates an example of extraction of elements according to the first embodiment. In FIG. 3, an element extraction process according to the first embodiment is represented by state transitions of sets stored in the storage unit 1. In this example of FIG. 3, a threshold number of occurrences, a threshold number of included elements, and a threshold number of common elements are all set to "2".

A first state is an initial state of the sets stored in the storage unit 1. Referring to FIG. 3, seven sets a, b, c, d, e, f, and g are stored in the storage unit 1. Elements included in the sets are represented by alphabets on the right side of the identifiers of the sets. Out of the plurality of sets stored in the storage unit 1, the set e has only one element, less than the threshold number of included elements. Therefore, the set e is deleted from the storage unit 1. In addition, by counting, as the number of occurrences, how many sets include each element included in the sets remaining after the deletion of the set e, the number of occurrences for the element "E" is counted as "1", less than the threshold number of occurrences. Therefore, the element "E" is deleted from the set d.

Since the element "E" has been deleted, the number of elements included in the set d decreases from "2" to "1". This means that the set d has less than the threshold number of included elements. Therefore, the set d is deleted from the storage unit 1. No more sets or elements need to be deleted, and therefore the first round of the set and element deletion process is completed.

A second state is a state after the first round of the set and element deletion process is completed. Out of the sets remaining in the storage unit 1, sets having in common at least the threshold number of common elements are associated with each other. In this case, the sets a, b, and c mutually have in common at least the threshold number of common elements, and so are associated with each other. In addition, the sets f and g have in common at least the threshold number of common elements, and so are associated with each other. As a result, a group 6a to which the sets a, b, and c belong and a group 6b to which the sets f and g belong are generated.

A third state is a state after the groups are generated. With respect to each of the generated groups 6a and 6b, a set having less than the threshold number of included elements and an element existing in only sets whose number is less than the threshold number of occurrences in the group are deleted. By counting, as the number of occurrences, how many sets include each element in each of the groups 6a and 6b, the number of occurrences for the element "F" is counted as only "1" in both groups 6a and 6b. Therefore, the element "F" is deleted from each of the groups 6a and 6b.

A fourth state is a state after the second round of the set and element deletion process is completed. In the fourth state, association is made in the sets remaining in each of the groups 6a and 6b. Referring to the example of FIG. 3, the sets in each of the existing groups 6a and 6b are associated with each other, and no group is separated from these groups. Therefore, lists 7a and 7b of the elements included in the sets remaining in the respective groups 6a and 6b are output.

The lists 7a and 7b of elements output in this way satisfy the above-described first and second element extraction conditions. Thus, each of the lists 7a and 7b of elements indicates a set of elements which are included together in many of a plurality of sets associated with each other in terms of commonality of elements.

In addition, the process according to the first embodiment efficiently narrows elements down by performing deletion of sets and elements that do not satisfy the first and second element extraction conditions and grouping of sets in terms of commonality of elements alternately. Therefore, this process needs less computational complexity, compared with the case of determining with respect to every different combination of a plurality of elements whether the combination satisfies the above-described first and second element extraction conditions. As a result, even in the case where there is a large number of elements, sets of elements which are included together in many of a plurality of sets associated with each other in terms of commonality of elements are efficiently extracted.

Depending on a threshold number of occurrences, a threshold number of included elements, and a threshold number of common elements, it may be previously determined that no group is separated from one group. For example, in the case where a threshold number of occurrences, a threshold number of included elements, and a threshold number of common elements are all set to "2", elements included in common in sets associated with each other in the first grouping are included in two or more sets, so that these elements are not deleted in the subsequent deletion process. In addition, sets belonging to a group each have two or more elements that do not need to be deleted, so that these sets do not need to be deleted. In associating sets in terms of commonality of elements in the group, all of the sets in the group are associated with each other, so that no group is separated. Therefore, in the case where it is previously determined that no group is separated, steps S4 and S5 of FIG. 2 may be skipped, and a list of elements in each group from which sets and elements have been deleted may be output.

(B) Second Embodiment

The following describes a second embodiment. In this second embodiment, transaction data is collected from a POS system, and knowledge regarding appropriate combinations of items to be listed in a menu list to be provided to customers is obtained. In this connection, items included in the transaction data are one example of elements described in the first embodiment, and the transaction data is one example of sets including elements described in the first embodiment.

Figure 4:
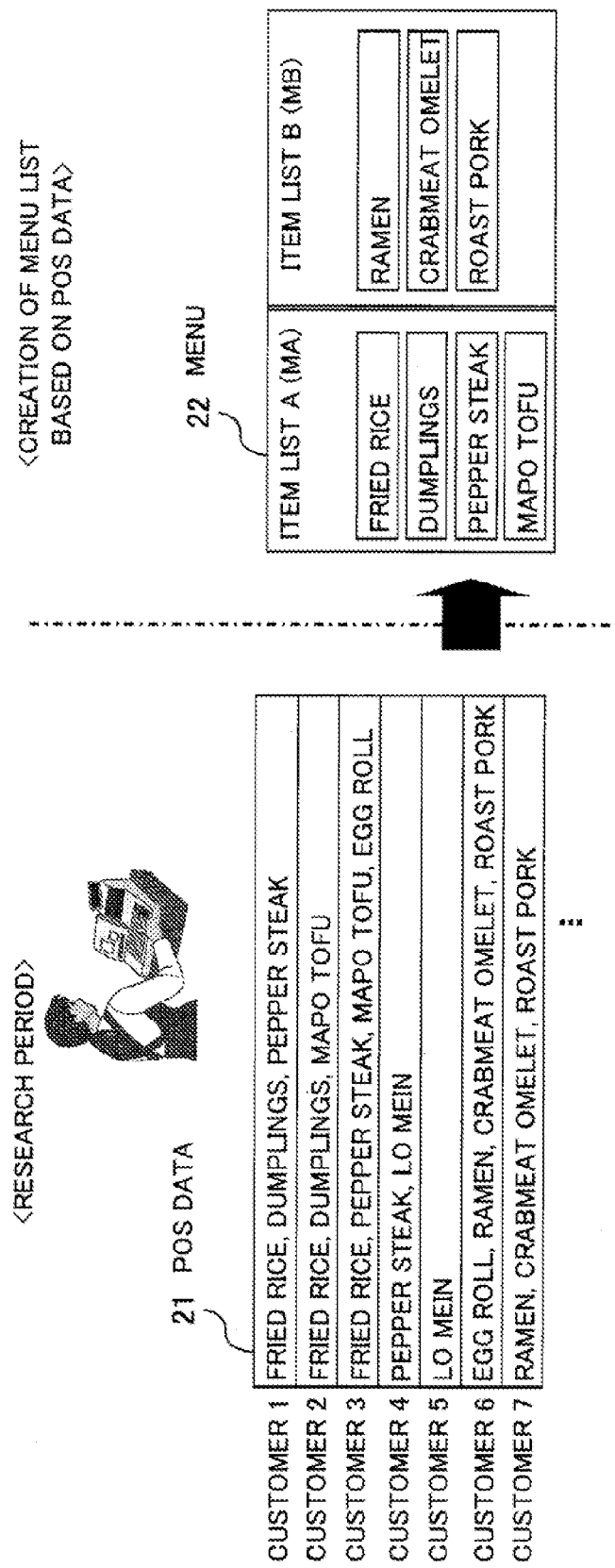
FIG. 4 illustrates an example of item extraction that is assumed in a second embodiment.

FIG. 4 illustrates an example of item extraction that is assumed in the second embodiment. In this example of FIG. 4, a POS terminal device at a restaurant stores POS data 21 indicating items ordered by each customer. In this connection, a list of items ordered by each customer, included in the POS data 21, is transaction data. Referring to FIG. 4, for example, data indicating that the "customer 1" ordered "fried rice, dumplings, and pepper steak" is stored. When such POS data is accumulated for a predetermined research period, data mining is performed using the accumulated POS data 21.

In the data mining, sets each including as many items that are frequently ordered together as possible are extracted. Then, the staff of the restaurant creates a menu 22 that lists the sets of items frequently ordered together. For example, in the case where "fried rice", "dumplings", "pepper steak", and "mapo tofu" are frequently ordered together, the menu 22 listing these items on the same page is created. By listing items included in an extracted set on the same page of a menu in this way, customers are able to find items that they want to order on one page, so the customers would feel comfortable with ordering.

In the second embodiment, a user-friendly menu is defined as follows.

There were many customers in the past by whom every item in a menu was ordered together with other items of the menu.

A group of customers (customer group) who ordered many items together in a menu is a group of customers who have similar tastes (ordered many same items in the menu).

More specifically, assume that a menu that satisfies the following conditions is to be created. In this connection, threshold values k, m, and n are previously set. In this embodiment, k is an integer of 2 or greater, m is an integer of 1 or greater, and n is an integer between 1 and k.

(Conditions 1) Each item in a menu needs to have been ordered by m or more customers out of a group of customers who ordered k or more items in the menu. In the case of transaction data, the conditions are that every item in an item set to be extracted needs to be included in m or more transactions each including k or more items out of the item set.

(Conditions 2) Each customer of a customer group, who ordered k or more items in a menu, needs to be associated with other customers of the customer group in terms of ordering n or more same items in the menu. In the case of transaction data, the conditions are that a group of transactions including k or more items out of an item set is a collection of transactions associated with each other in terms of having in common n or more items out of the item set.

Figure 5:
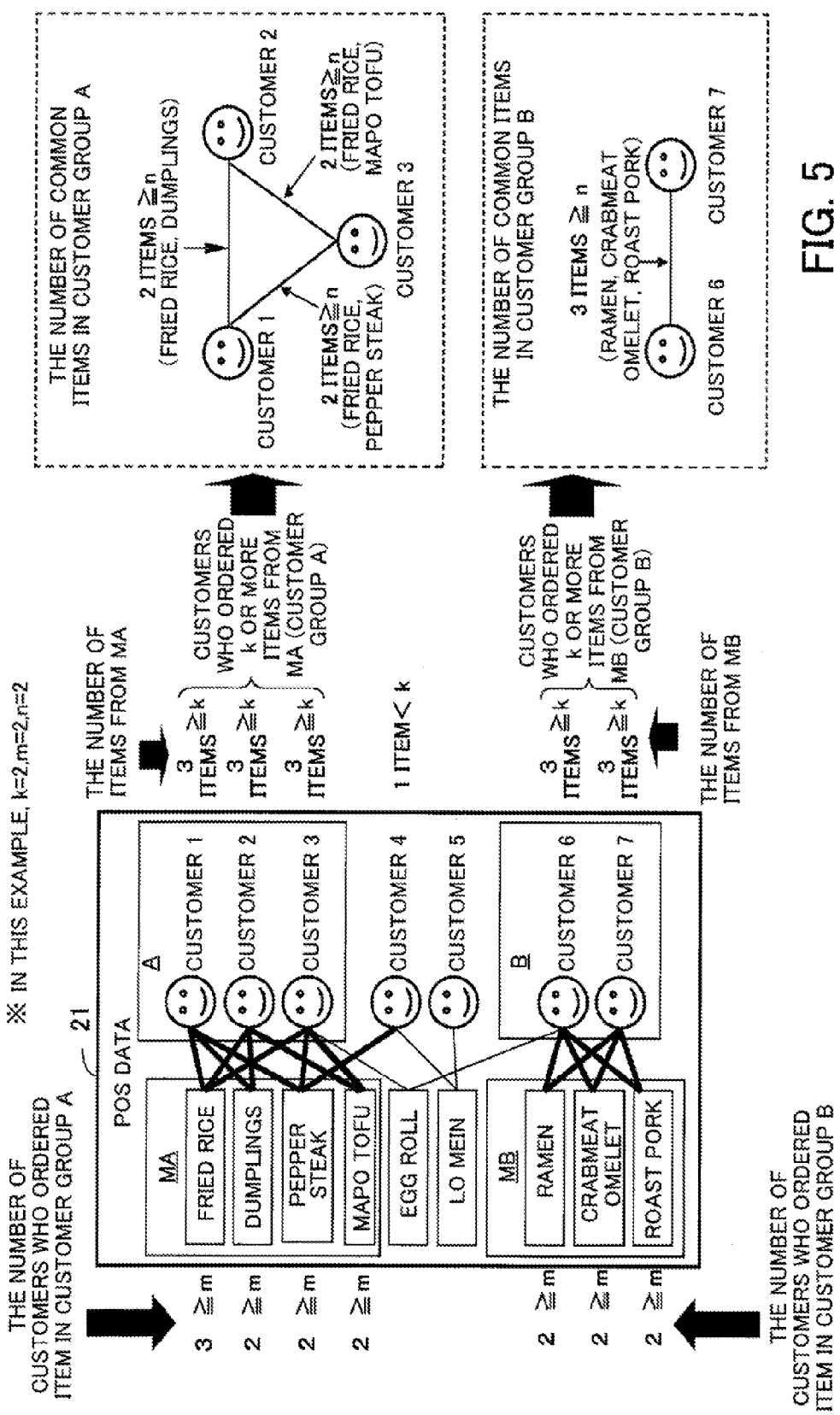
FIG. 5 illustrates an example of extraction of item sets under conditions for a user-friendly menu.

FIG. 5 illustrates an example of extraction of item sets under conditions for a user-friendly menu. FIG. 5 graphically illustrates POS data 21. In the POS data 21 of FIG. 5, customers and their ordered items are connected with lines. In addition, the threshold values k, m, and n in the above "conditions 1" and "conditions 2" are set to 2, 2, and 2, respectively.

Referring to the example of FIG. 5, two item sets MA and MB are checked to determine whether or not they satisfy the above "conditions 1" and "conditions 2".

Item Set MA

The item set MA includes "fried rice", "dumplings", "pepper steak", and "mapo tofu" as items ordered by customers.

First, the item set MA is checked to determine whether this item set MA satisfies the "conditions 1" or not. The customers who ordered any of the items included in the item set MA are "customer 1", "customer 2", "customer 3", and "customer 4". The "customer 1", "customer 2", and "customer 3" ordered three items in the item set MA. On the other hand, the "customer 4" ordered one item in the item set MA. Therefore, customers who ordered k(=2) or more items in the item set MA are "customer 1", "customer 2", and "customer 3". As a result, a customer group A of "customer 1", "customer 2", and "customer 3" is generated.

Out of the items of the item set MA, "fried rice" was ordered by all of the three customers of the customer group A. "Dumplings", "pepper steak", and "mapo tofu" were ordered by two customers of the customer group A. This means that every item was ordered by m(=2) or more customers.

Therefore, the item set MA satisfies the "conditions 1".

Next, the item set MA is checked to determine whether this item set MA satisfies the "conditions 2" or not. The "customer 1" of the customer group A ordered "fried rice" and "dumplings" in the item set MA in common with another "customer 2" of the customer group A. The "customer 2" of the customer group A ordered "fried rice" and "mapo tofu" in the item set MA in common with another "customer 3" of the customer group A. The "customer 3" of the customer group A ordered "fried rice" and "pepper steak" in the item set MA in common with another "customer 1" of the customer group A. Therefore, every customer of the customer group A ordered n(=2) or more items in common with another customer of the same customer group. Therefore, the item set MA also satisfies the "conditions 2".

As a result, a menu listing the items included in the item set MA satisfies the conditions for a user-friendly menu. For example, a menu listing "fried rice", "dumplings", "pepper steak", and "mapo tofu" indicated by the item set MA is user friendly for many customers who have similar tastes to the "customer 1", "customer 2", and "customer 3".

Item Set MB

The item set MB includes "ramen", "crabmeat omelet", and "roast pork" as items ordered by customers.

First, the item set MB is checked to determine whether this item set MB satisfies the "conditions 1" or not. Customers who ordered any of the items included in the item set MB are "customer 6" and "customer 7". The "customer 6" and "customer 7" ordered three items in the item set MB. Therefore, customers who ordered k(=2) or more items out of the items included in the item set MB are the "customer 6" and "customer 7". Therefore, a customer group B of the "customer 6" and "customer 7" is generated.

Out of the items included in the item set MB, "ramen", "crabmeat omelet", and "roast pork" were ordered by two customers belonging to the customer group B. This means that every item was ordered by m(=2) or more customers.

Accordingly, the item set MB satisfies the "conditions 1".

Next, the item set MB is checked to determine whether this item set MB satisfies the "conditions 2" or not. The "customer 6" of the customer group B ordered "ramen", "crabmeat omelet", and "roast pork" in the item set MB in common with another "customer 7" of the customer group B. This means that every customer of the customer group B ordered n(=2) or more items in the item set MB in common with another customer of the same group. Therefore, the item set MB also satisfies the "conditions 2".

As a result, a menu listing the items included in the item set MB satisfies the conditions for a user-friendly menu.

According to the second embodiment, an item extraction process that is usable for determining items to be listed in a user-friendly menu is efficiently performed. For example, a menu that lists items, "ramen", "crabmeat omelet", and "roast pork", indicated by the item set MB is user friendly for many customers who have similar tastes to the "customer 6" and "customer 7".

As described above, a useful menu is created by extracting item sets satisfying the "conditions 1" and "conditions 2". These conditions for item sets are denoted by the following logical expression. That is, a combination X of items satisfying the following conditions is extracted.

$$\exists Y \subseteq Y_0$$

$$((\forall y \in Y) f(y, X) \geq k)^\wedge$$

$$((\forall x \in X) g(x, Y) \geq m)^\wedge$$

$$((\forall \{y_i, y_j\} \subseteq Y) r(y_i, y_j, X, Y, n) < \infty) \quad (1)$$

Here, $Y_0$ represents a set of all transactions. Y is a subset of $Y_0$. "$\exists Y \subseteq Y_0$" defines a desired subset Y of $Y_0$. "$^\wedge$" is a symbol representing a logical AND.

"$(\forall y \in Y)$" indicates that all transactions y belong to the subset Y. "f(y, X)" indicates the number of items included in the transactions y out of the items included in the item combination X.

"$(\forall x \in X)$" indicates that all items x belong to the item combination X. "g(x, Y)" indicates the number of transactions including item x out of the transactions included in the subset Y.

$y_i$ represents an i-th transaction y (i is an integer of 1 or greater). $y_j$ represents a j-th transaction (y is an integer of 1 or greater). "$(\forall \{y_i, y_j\} \subseteq Y)$" indicates that every combination of transaction $y_i$ and transaction $y_j$ is a subset of the transaction subset Y. "r($y_i$, $y_j$, X, Y, n)" represents the path length of the shortest path obtained by tracking transactions included in the subset Y, from $y_i$ to $y_j$, in the transactions having in common n or more items out of the items included in the item combination X. For example, in the case where $y_i$ and $y_j$ have in common n or more items out of the items included in the item combination X, r($y_i$, $y_j$, X, Y, n) is calculated as 1. In the case where there is no path linking transactions included in the subset Y from $y_i$ to $y_j$ in the transactions having in common n or more items out of the items included in the item combination X, r($y_i$, $y_j$, X, Y, n) is calculated as $\infty$. Therefore, in the case where there are one or more such paths, the conditions of "r($y_i$, $y_j$, X, Y, n)<$\infty$" are satisfied.

The following describes the configuration of a system for extracting item sets satisfying the above logical expression.

Figure 6:
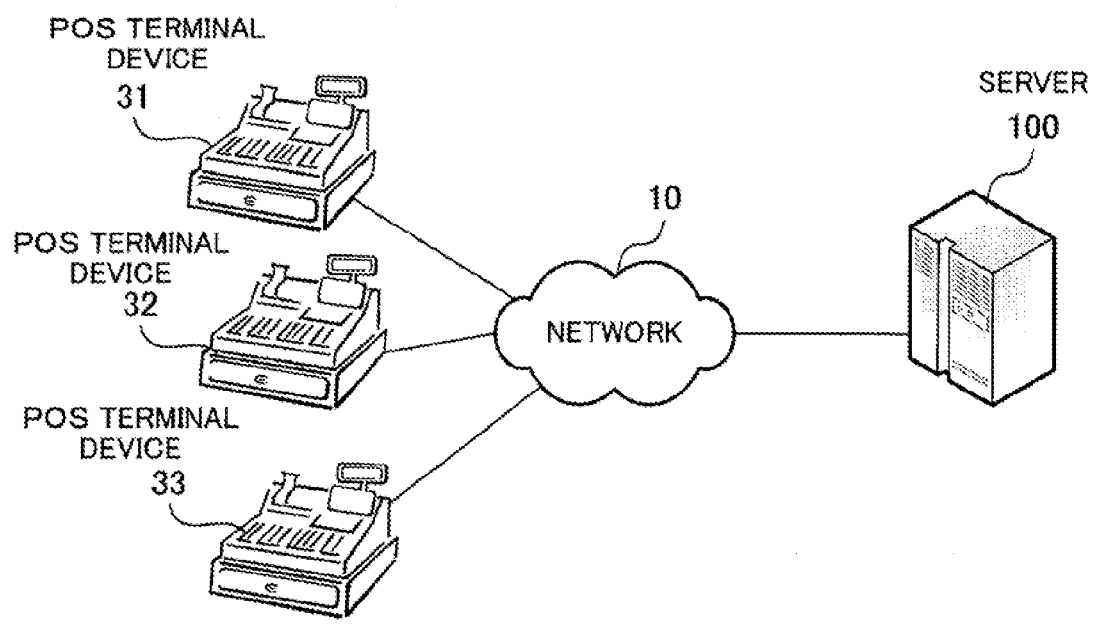
FIG. 6 illustrates an exemplary system configuration according to the second embodiment.

FIG. 6 illustrates an exemplary system configuration according to the second embodiment. Connected to a server 100 is a plurality of POS terminal devices 31 to 33 via a network 10. The POS terminal devices 31 to 33 are installed at affiliated restaurants, for example. The POS terminal devices 31 to 33 store lists of items ordered by customers as transaction data, and send the stored transaction data to the server 100.

The server 100 performs data mining based on the transaction data collected from the POS terminal devices 31 to 33.

Figure 7:
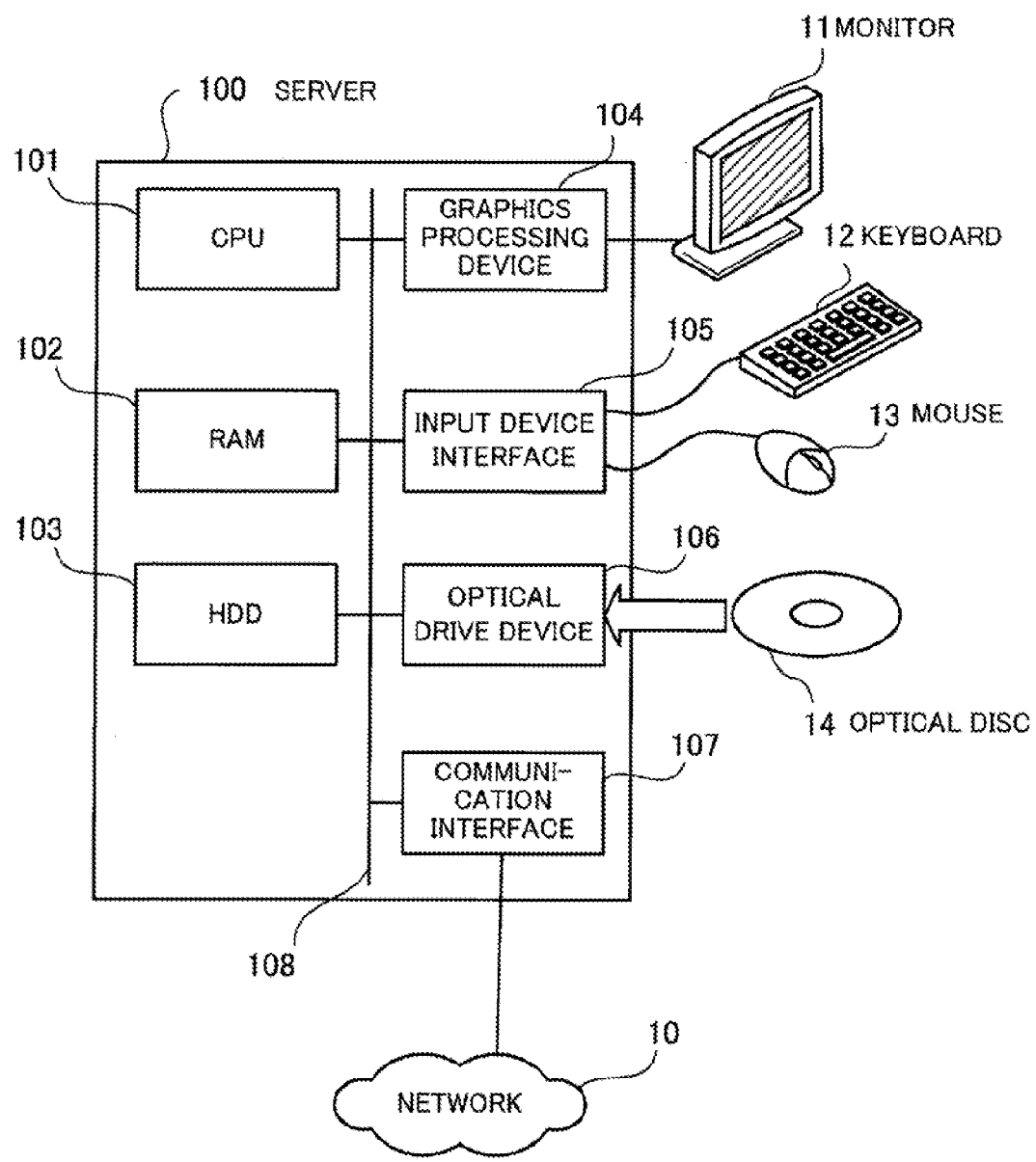
FIG. 7 illustrates an example configuration of hardware components of a server used in the second embodiment.

FIG. 7 illustrates an example configuration of hardware components of a server used in the second embodiment. The server 100 is entirely controlled by a CPU 101. Connected to the CPU 101 are a RAM 102 and a plurality of peripheral devices via a bus 108.

The RAM 102 is used as a main memory device of the server 100. The RAM 102 temporarily stores part of Operating System (OS) programs and application programs to be executed by the CPU 101. The RAM 102 also stores various data to be used while the CPU 101 operates.

The peripheral devices connected to the bus 108 include an HDD 103, graphics processing device 104, input device interface 105, optical drive device 106, and communication interface 107.

The HDD 103 magnetically writes and reads data on an internal disk. The HDD 103 is used as a secondary storage device of the server 100. The HDD 103 stores the OS programs, application programs, and various data. In this connection, a flash memory or another kind of semiconductor storage device may be used as a secondary storage device.

A monitor 11 is connected to the graphics processing device 104. The graphics processing device 104 displays an image on the screen of the monitor 11 under the control of the CPU 101. As the monitor 11, a display device using Cathode Ray Tube (CRT) or a liquid crystal display device may be used.

A keyboard 12 and mouse 13 are connected to the input device interface 105. The input device interface 105 transfers signals from the keyboard 12 and mouse 13 to the CPU 101. The mouse 13 is one example of a pointing device, and another pointing device such as a touch panel, tablet, touchpad, or trackball may be used.

The optical drive device 106 reads data from an optical disc 14 using laser light. The optical disc 14 is a portable recording medium on which data is recorded so as to be read with reflection of light. A Digital Versatile Disc (DVD), DVD-RAM, Compact Disc Read Only Memory (CD-ROM), or CD-R (Readable)/RW (ReWritable) may be used as the optical disc 14.

The communication interface 107 is connected to a network 10. The communication interface 107 performs data communications with another computer or communication apparatus via the network 10.

The processing functions of this embodiment are realized by using the above hardware configuration. In this connection, the information processing apparatus C according to the first embodiment may be realized by using the same hardware components as the server illustrated in FIG. 7.

Figure 8:
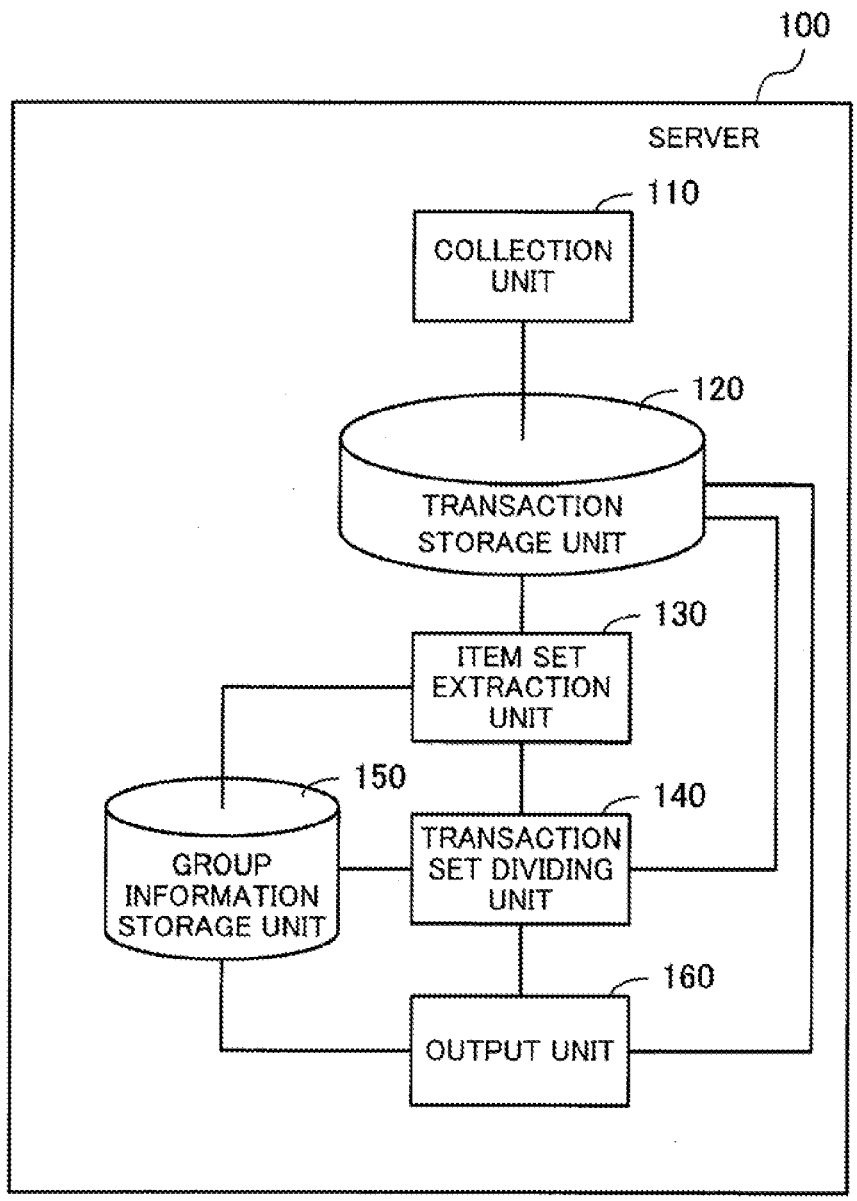
FIG. 8 is a block diagram illustrating the functions of the server.

FIG. 8 is a block diagram illustrating the functions of a server. The server 100 includes a collection unit 110, transaction storage unit 120, item set extraction unit 130, transaction set dividing unit 140, group information storage unit 150, and output unit 160.

The collection unit 110 collects transaction data from the POS terminal devices 31 to 33. The collection unit 110 stores the collected transaction data in the transaction storage unit 120.

The transaction storage unit 120 stores transaction data. The transaction data stored in the transaction storage unit 120 is updated by the item set extraction unit 130. The updating of the transaction data includes deletion of transaction data and deletion of items. For example, a partial storage region of the RAM 102 or HDD 103 is used as the transaction storage unit 120.

The item set extraction unit 130 extracts item sets that indicate items to be listed in a menu and satisfy the "conditions 1", which have been described earlier, from the transaction data stored in the transaction storage unit 120. The item set extraction unit 130 updates the transaction data in the transaction storage unit 120 in the course of the item set extraction process. In this connection, in the case where groups of transactions have been registered in the group information storage unit 150, the item set extraction unit 130 performs the item set extraction process on the basis of the transaction data relating to the transactions belonging to the same group.

The transaction set dividing unit 140 classifies transactions into a plurality of groups in such a way that transaction data of customers satisfying the "conditions 2", which have been described earlier, is grouped on the basis of the items extracted by the item set extraction unit 130. The transaction set dividing unit 140 stores the classification result in the group information storage unit 150.

The group information storage unit 150 stores information relating to the transaction data belonging to each group of transactions. For example, a partial storage region of the RAM 102 or HDD 103 is used as the group information storage unit 150.

When the transaction set dividing unit 140 determines that no further classification is possible, the output unit 160 consults the transaction storage unit 120 and the group information storage unit 150 to output the maximum item set for each group.

In this connection, in FIG. 8, lines connecting between functions represent communication paths, and other communication paths may be set. In addition, the transaction storage unit 120 is one example of the storage unit 1 of the first embodiment illustrated in FIG. 1. The item set extraction unit 130 is one example of the combined functions of the first deletion unit 2 and second deletion unit 4 of the first embodiment illustrated in FIG. 1. The transaction set dividing unit 140 is one example of the combined functions of the grouping unit 3 and group dividing unit 5 of the first embodiment illustrated in FIG. 1. The output unit 160 is one example of the output unit 6 of the first embodiment illustrated in FIG. 1.

The following describes an exemplary data structure of each storage unit illustrated in FIG. 8.

Figure 9:
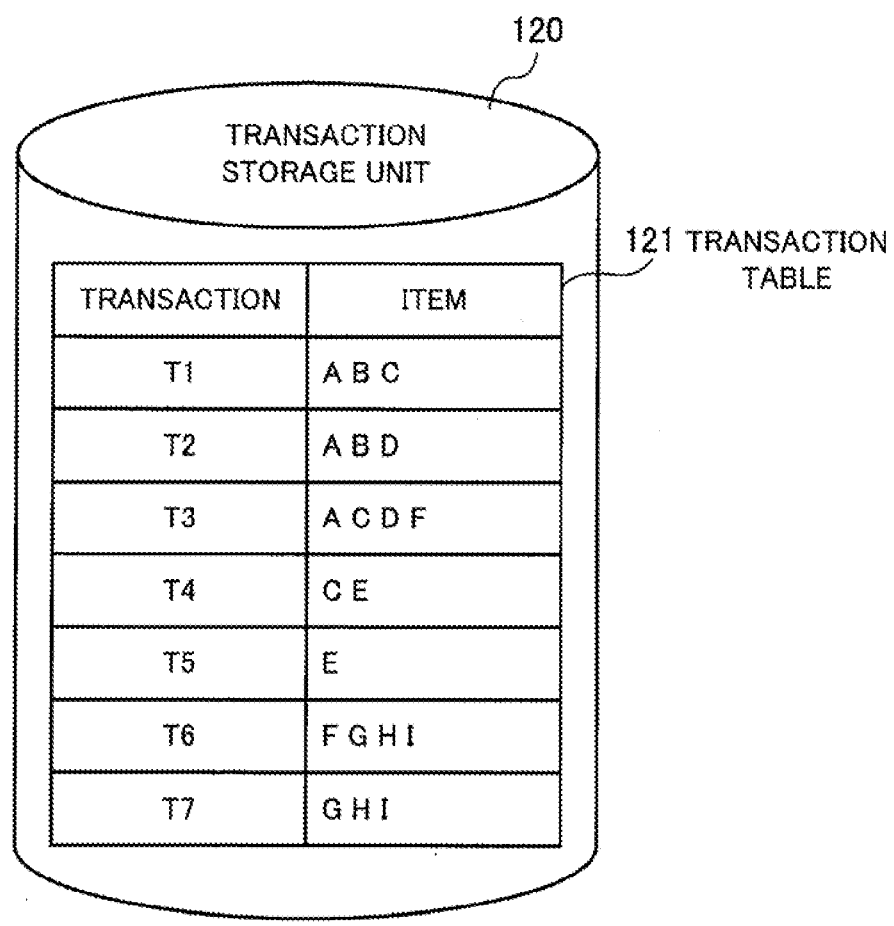
FIG. 9 illustrates an exemplary data structure of a transaction storage unit.

FIG. 9 illustrates an exemplary data structure of a transaction storage unit. The transaction storage unit 120 stores a transaction table 121.

The transaction table 121 has fields for transaction and item. The transaction field contains the identification information (transaction ID) of collected transaction data. The item field contains the identification information (item ID) of items included in collected transaction data.

Figure 10:
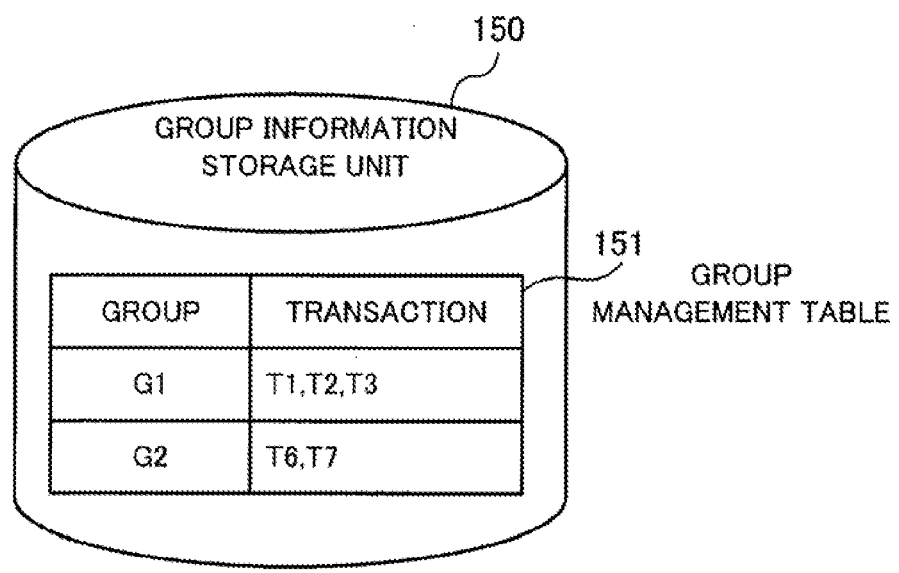
FIG. 10 illustrates an exemplary data structure of a group information storage unit.

FIG. 10 illustrates an exemplary data structure of a group information storage unit. The group information storage unit 150 stores a group management table 151.

The group management table 151 has fields for group and transaction. The group field contains the identification information (group ID) of a group of transactions. The transaction field contains the transaction IDs of the transactions belonging to a corresponding group.

The following describes the item set extraction process according to the second embodiment.

Figure 11:
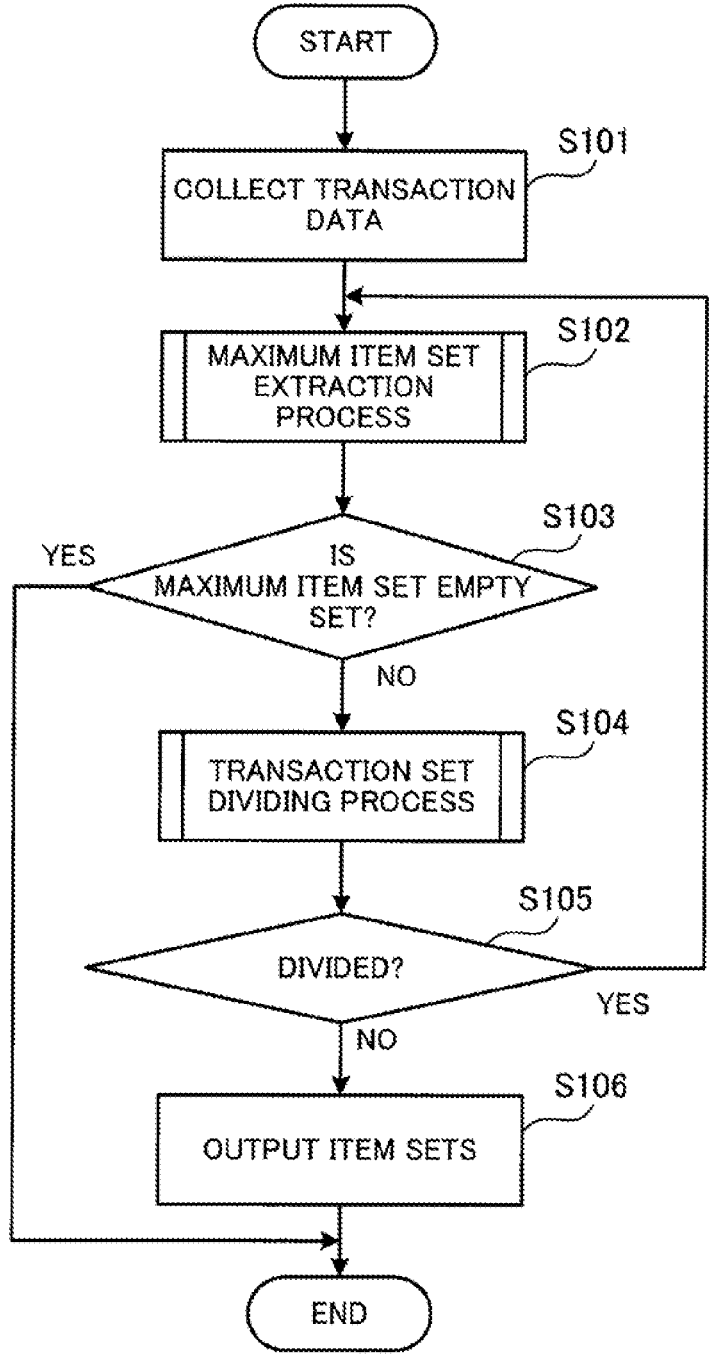
FIG. 11 is a flowchart illustrating an example of an item set extraction process.

FIG. 11 is a flowchart illustrating an example of an item set extraction process. This process will be described step by step.

At step S101, the collection unit 110 collects transaction data from the POS terminal devices 31 to 33. For example, the collection unit 110 collects the transaction data in response to an instruction from a user. In addition, the collection unit 110 may be designed to collect transaction data at predetermined intervals. Furthermore, the collection unit 110 is capable of receiving transaction data that is sent at certain timing by the POS terminal devices 31 to 33. The collection unit 110 stores the collected transaction data in the transaction storage unit 120.

At step S102, the item set extraction unit 130 performs a maximum item set extraction process. For example, the item set extraction unit 130 performs the maximum item set extraction process in response to an instruction from a user.

In this connection, in the case where no group of transactions has been registered in the group information storage unit 150, the item set extraction unit 130 handles, as one group, the transactions indicated by all of the transaction data stored in the transaction storage unit 120, and performs the maximum item set extraction process on the all transactions.

In the case where groups of transactions have been registered in the group information storage unit 150, the item set extraction unit 130 performs the maximum item set extraction process for each group. In this case, the maximum item set extraction process for a group is performed on the transactions belonging to the group. The maximum item set extraction process will be described in detail later (with reference to FIG. 13).

At step S103, the item set extraction unit 130 determines whether a maximum item set obtained at step S102 is an empty set or not. When the maximum item set is an empty set, this process is completed. When the maximum item set is not an empty set, on the other hand, this process proceeds to step S104. In the case where the maximum item set is not an empty set, the item set extraction unit 130 instructs the transaction set dividing unit 140 to divide a transaction set, for example.

At step S104, the transaction set dividing unit 140 performs a transaction set dividing process. For example, the transaction set dividing unit 140 performs the transaction set dividing process in response to a transaction set dividing instruction from the item set extraction unit 130. This transaction set dividing process will be described in detail later.

At step S105, the transaction set dividing unit 140 determines whether a transaction set was divided into a plurality of groups at step S104 or not. When the transaction set was divided, the process proceeds to step S102. When the transaction set was not divided, the process proceeds to step S106. In the case where the transaction set has not been divided, the transaction set dividing unit 140 instructs the output unit 160 to output the items of the transaction group, for example.

At step S106, the output unit 160 outputs item sets. For example, the output unit 160 determines groups of transactions registered in the group information storage unit 150. Then, the output unit 160 consults the transaction storage unit 120 to extract the items included in the transaction data relating to the transactions belonging to each group. Then, the output unit 160 outputs a set of items extracted for each group.

Figure 12:
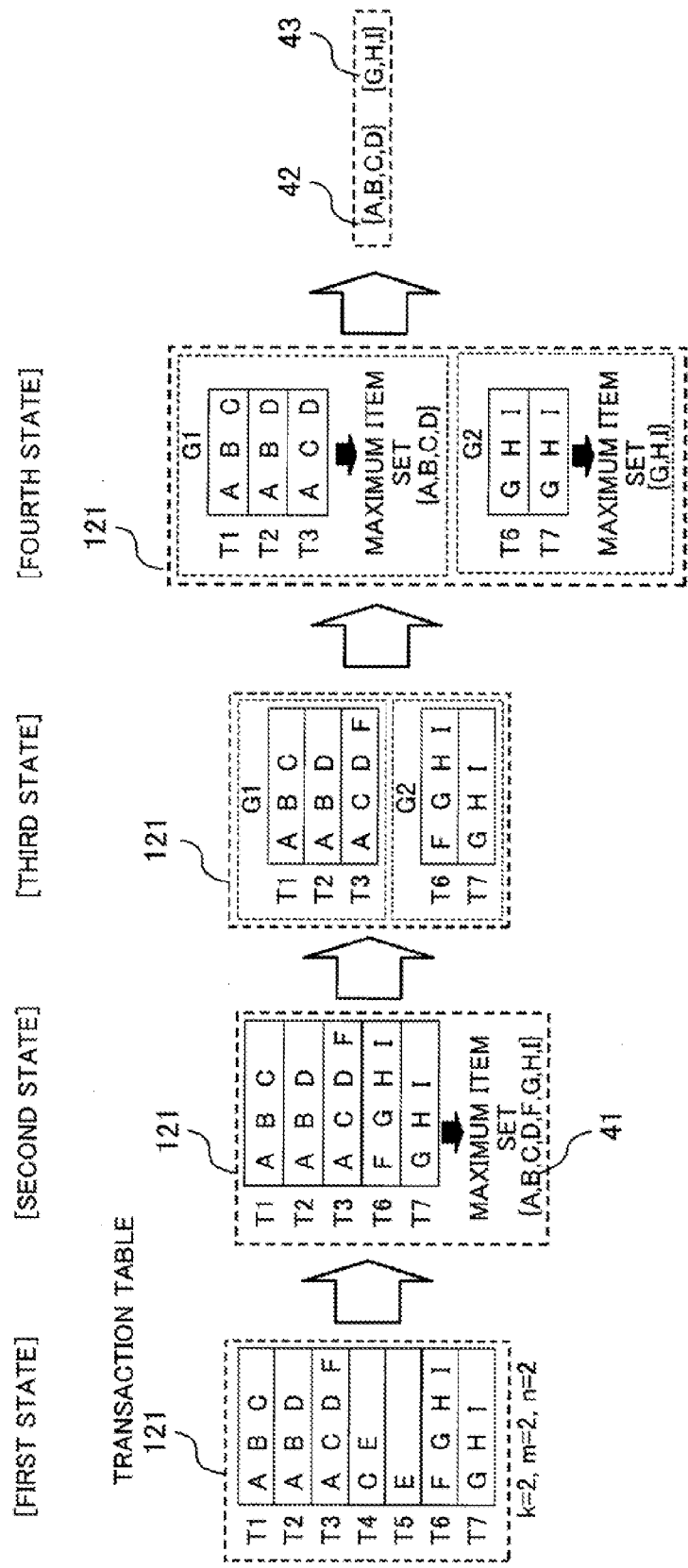
FIG. 12 illustrates an example of an item set extraction process.

FIG. 12 illustrates an example of an item set extraction process. A first state indicates input data to be given to the item set extraction process. The input data includes the transaction data set in the transaction table 121, and threshold values (k, m, and n). When the item set extraction process starts, the maximum item set extraction process is performed, and then the state transitions to a second state.

In the second state, transaction data and items that do not satisfy the "conditions 1" have been deleted from the transaction table 121. More specifically, transaction data having less than k items and items for which the number of occurrences of transactions is less than m have been deleted. Then, a set of items included in any of the transaction data remaining in the transaction table 121 is extracted as a maximum item set 41. Then, the transaction set dividing process is performed, and the state transitions to a third state.

The third state is a state after the transaction set is divided. A plurality of groups of transactions is generated by dividing the transaction set. Transactions that are linked one another by tracking associations between transactions having in common n or more items belong to the same group. After the transaction set has been divided, the maximum item set extraction process is performed for each group, and then the state transitions to a fourth state.

The fourth state is a state after the second round of the maximum item set extraction process is completed. In the second round of the maximum item set extraction process, with respect to each group, transaction data having less than k items and items for which the number of occurrences of transactions is less than m are deleted. As a result, maximum item sets 42 and 43 are extracted for the respective groups.

Then, the transaction set dividing process is performed, but each group is no more possible to be divided. Therefore, the maximum item sets 42 and 43 for the respective groups are output.

By repeating the above maximum item set extraction process and transaction set dividing process, maximum item sets satisfying the "conditions 1" and "conditions 2" are obtained.

The maximum item set extraction process will now be described.

Figure 13:
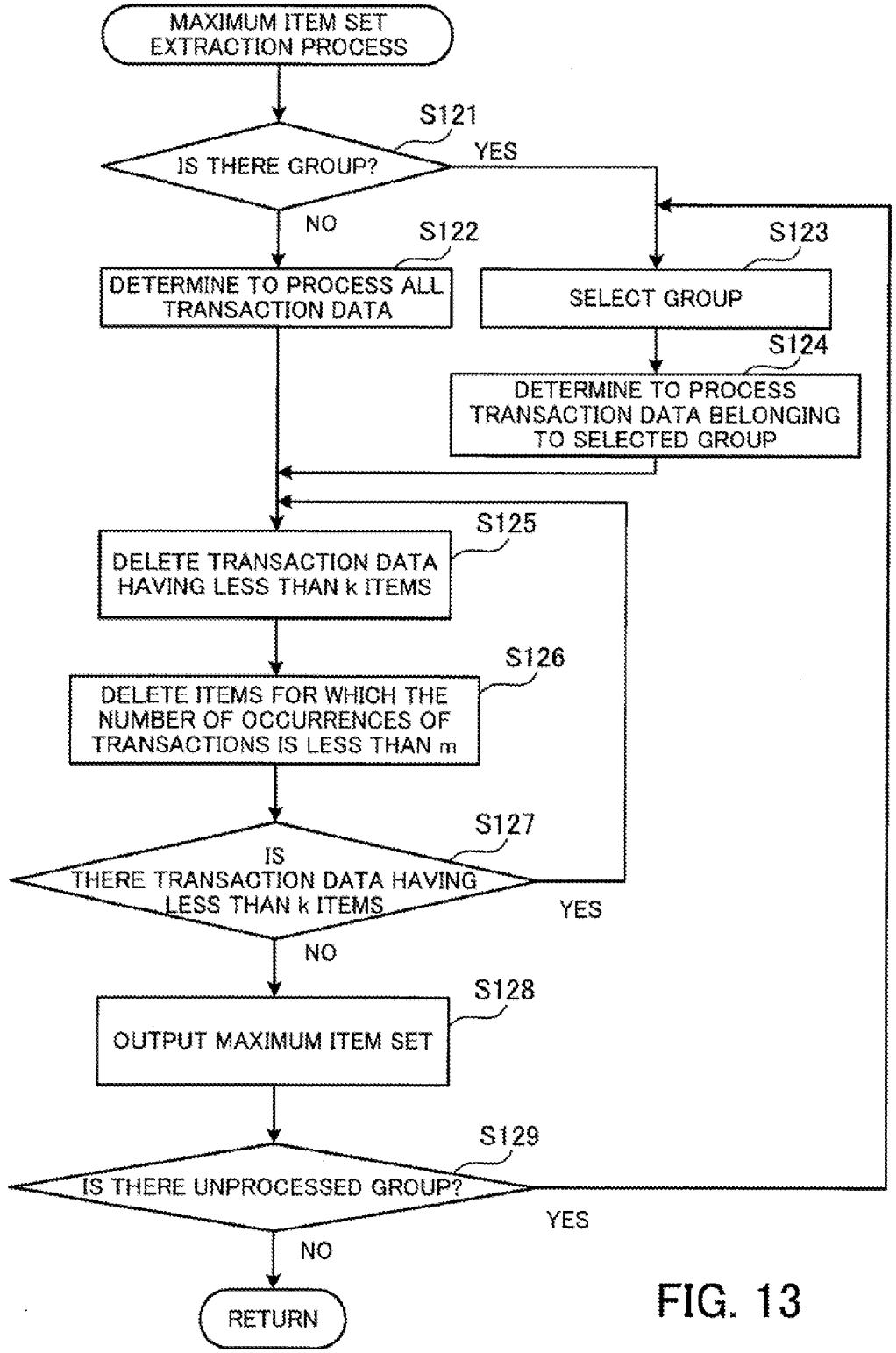
FIG. 13 is a flowchart illustrating an example of a maximum item set extraction process.

FIG. 13 is a flowchart illustrating an example of a maximum item set extraction process. This process of FIG. 13 will be described step by step.

At step S121, the item set extraction unit 130 determines whether a group has been registered in the group management table 151 or not (refer to FIG. 10). When a group has been registered, the process proceeds to step S123. Otherwise, the process proceeds to step S122.

At step S122, the item set extraction unit 130 determines to process all the transaction data registered in the transaction table 121 (refer to FIG. 9). Then the process proceeds to step S125.

At step S123, the item set extraction unit 130 selects one of groups which have not been subjected to step S125 to S128, out of the all groups registered in the group management table 151.

At step S124, the item set extraction unit 130 determines to process the transaction data belonging to the selected group.

At step S125, the item set extraction unit 130 deletes transaction data having less than k items, from the transaction data currently in processing, from the transaction table 121. At this time, in the case where the transaction ID of the transaction data to be deleted has been set in the group management table 151, for example, the item set extraction unit 130 deletes the transaction ID. Customers who ordered the items indicated by transaction data having less than k items are not "customers who ordered k or more items", which is the "conditions 1". By deleting such transaction data, the amount of data to be analyzed in the subsequent process is reduced, thereby streamlining the process.

At step S126, the item set extraction unit 130 deletes items for which the number of occurrences of transactions is less than m, from the transaction data currently in processing stored in the transaction table 121. Items for which the number of occurrences of transactions is less than m are not "items ordered by m or more customers (m is an integer of 1 or greater)", which is the "conditions 1". By deleting such items, the amount of data to be analyzed in the subsequent process is reduced, thereby streamlining the process.

At step S127, the item set extraction unit 130 determines whether or not there is transaction data having less than k items out of the transaction data currently in processing in the transaction table 121. There may be transaction data having less than k items because of the deletion of items at step S126. Therefore, when there is transaction data having less than k items, the process returns to step S125 to delete the transaction data. In addition, in the case where there is no transaction data having less than k items, the process proceeds to step S128.

At step S128, the item set extraction unit 130 outputs a set of items that are included in any of the transaction data currently in processing, as a maximum item set.

At step S129, the item set extraction unit 130 determines whether or not there is any group that has not been processed in the group management table 151. When there is a group that has not been processed, the process returns to step S123. If there is no such a group, this maximum item set extraction process is completed.

The maximum item sets are extracted in this way.

Figure 14:
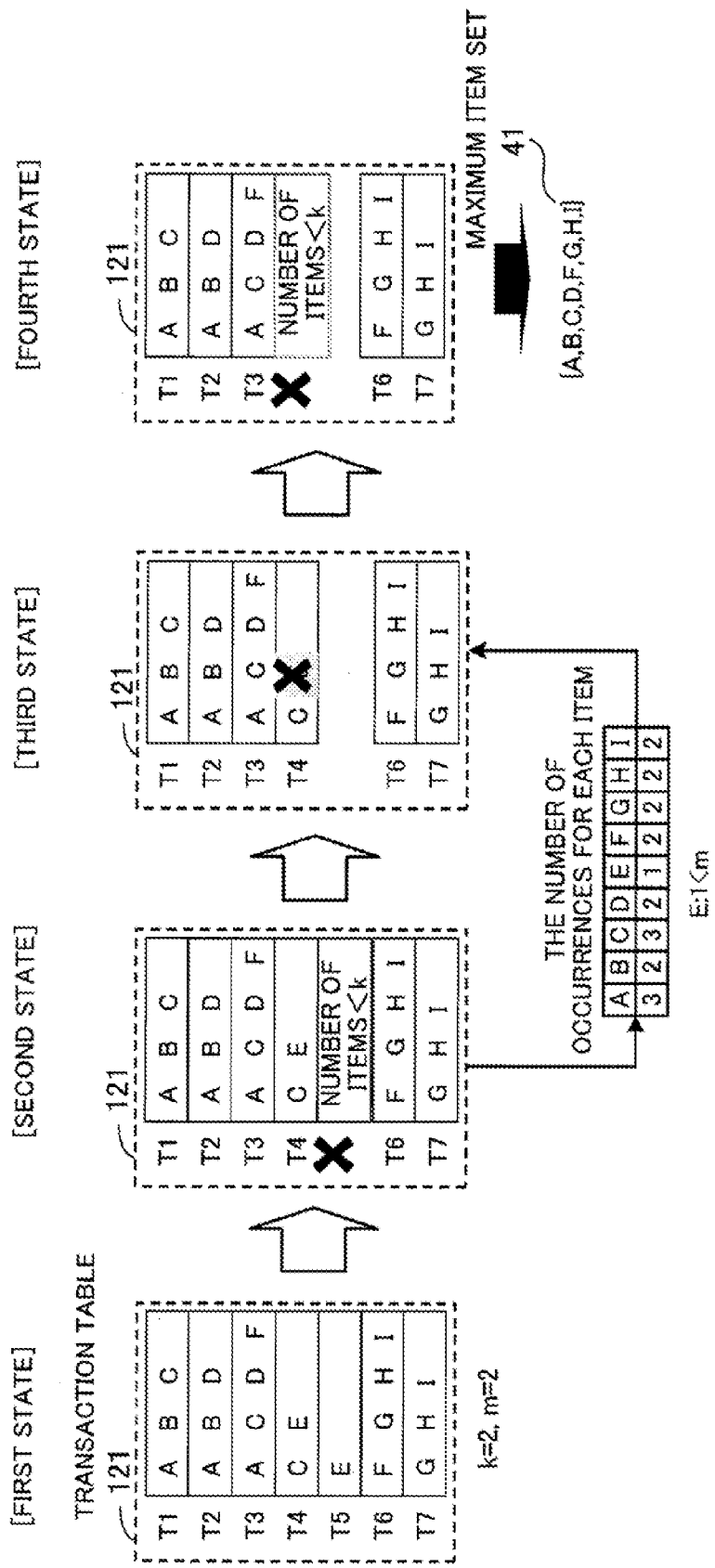
FIG. 14 illustrates an example of the maximum item set extraction process.

FIG. 14 illustrates an example of the maximum item set extraction process. FIG. 14 illustrates the state transitions of the transaction table 121 that are caused by the maximum item set extraction process. The transaction table 121 illustrated in FIG. 14 indicates transaction IDs on the left column, and also indicates a list of item IDs of items included in the transaction, in association with each transaction ID.

In this example of FIG. 14, it is assumed that no group of transactions has been registered. Therefore, the maximum item set extraction process is performed on all the transaction data registered in the transaction table 121.

A first state is an initial state of the transaction table 121. In the initial state, transaction data having less than k($=2$) items is detected from the transaction table 121. Therefore, the transaction data with transaction ID "T5", which has "1" item, is detected. Then, this transaction data is deleted from the transaction table 121.

A second state is a state after transaction data having less than k items is deleted. In the second state, with respect to each item included in any of the transaction data currently in processing, the number of occurrences in the transaction data is counted. Then, items for which the number of occurrences is less than m($=2$) are detected. In this example of FIG. 14, the item with item ID "E" for which the number of occurrences is "1" is detected, and the detected item is deleted from the transaction data currently in processing in the transaction table 121.

A third state is a state after items for which the number of occurrences is less than m are deleted. In this example of FIG. 14, the item with item ID "E" has been deleted from the transaction data with transaction ID "T4". After the item has been deleted, transaction data having less than k items is detected from the transaction table 121 again. Then, the transaction data with transaction ID "T4" which has now "1" item because of the deletion of the item is detected. Therefore, this transaction data is deleted from the transaction table 121.

A fourth state is a state after the second round of the deletion process is performed to delete transaction data having less than k items. In the fourth state, with respect to each item included in any of the transaction data currently in processing, the number of occurrences in the transaction data is counted. Then, items for which the number of occurrences is less than m are detected. However, there is no such an item detected in this fourth state. Therefore, a set of items included in any of the transaction data remaining in the transaction table 121 is extracted as a maximum item set 41.

If the extracted maximum item set is not an empty set, then the transaction set dividing process is performed.

Figure 15:
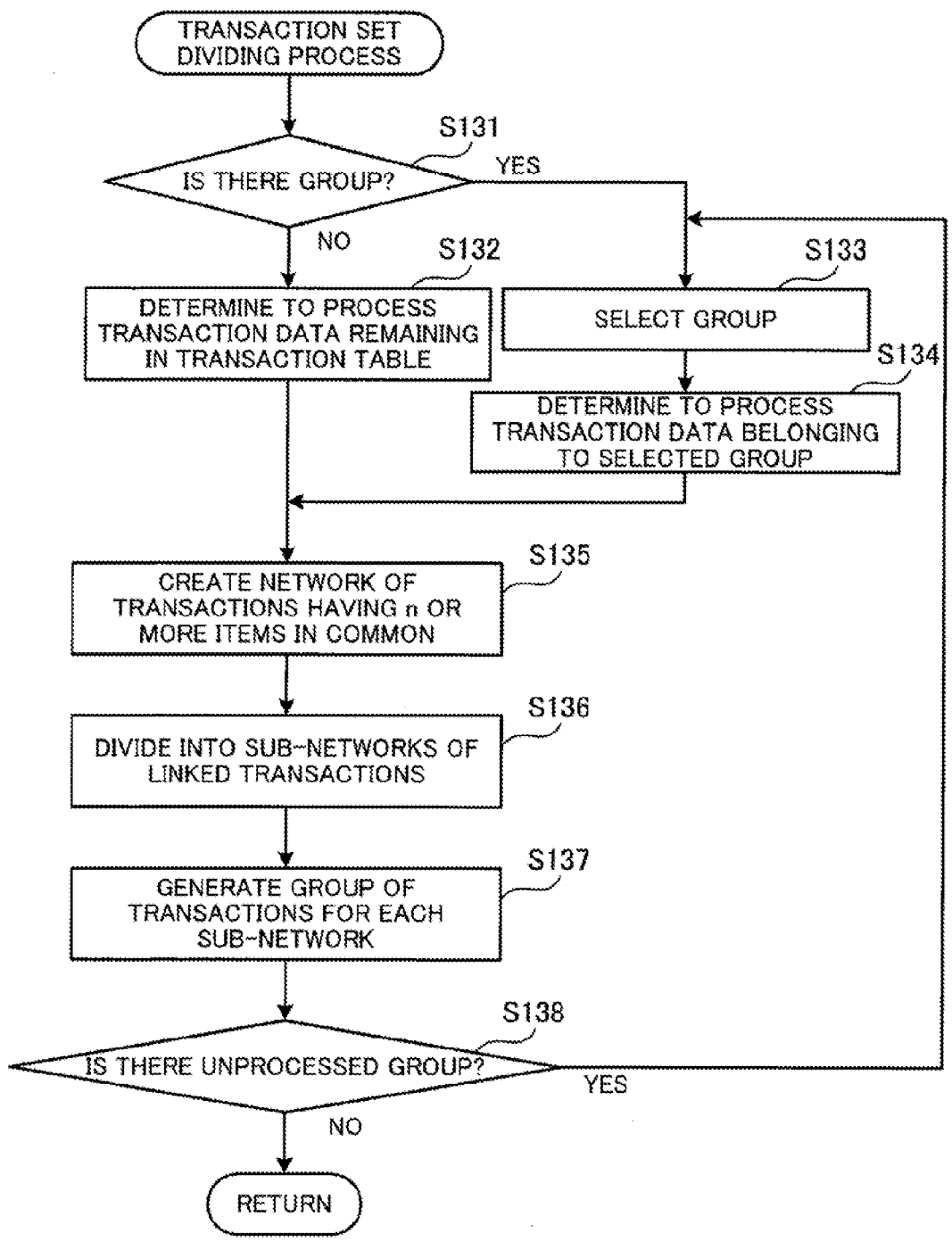
FIG. 15 is a flowchart illustrating a transaction set dividing process.

FIG. 15 is a flowchart illustrating a transaction set dividing process. This process will be described step by step.

At step S131, the transaction set dividing unit 140 determines whether a group has been registered in the group management table 151 or not (refer to FIG. 10). When a group has been registered, the process proceeds to step S133. Otherwise, the process proceeds to step S132.

At step S132, the transaction set dividing unit 140 determines to process all the transaction data remaining in the transaction table 121 (refer to FIG. 9). Then, the process proceeds to step S135.

At step S133, the transaction set dividing unit 140 selects one of groups which have not been subjected to steps S135 to S137, out of the groups registered in the group management table 151.

At step S134, the item set extraction unit 130 determines to process the transaction data belonging to the selected group.

At step S135, the transaction set dividing unit 140 creates a network with transaction data having n or more items in common out of the transaction data currently in processing. For example, with respect to every combination of two pieces of transaction data out of the transaction data currently in processing, the transaction set dividing unit 140 counts the number of items (the number of common items) that are included in both of the two pieces of transaction data. Then, with respect to each combination of transaction data which has n or more items in common, the transaction set dividing unit 140 associates these transaction data with each other. The transaction set dividing unit 140 sets a path indicating an association between the transaction data which has n or more items in common, for example, thereby creating a network of transactions connected with paths.

At step S136, the transaction set dividing unit 140 divides the network of all the transaction data currently in processing, into sub-networks of linked transaction data obtained by tracking the paths on the network. In this connection, a Connected Component extraction algorithm disclosed in the previously-mentioned literature, J. Hoperoft, R. Tarjan, "*Efficient algorithms for graph manipulation*", may be used as a technique for this dividing into sub-networks.

At step S137, the transaction set dividing unit 140 generates a group of transactions for each sub-network. For example, the transaction set dividing unit 140 registers the transactions belonging to a sub-network generated at step S136, as one new group in the group management table 151. In addition, when the sub-groups generated by dividing the group selected at step S133 are registered, the transaction set dividing unit 140 deletes the original group from the group management table 151.

At step S138, the transaction set dividing unit 140 determines whether or not there is any group that has not been processed out of the groups which were registered in the group management table 151 at the time of starting the transaction set dividing process. If there is a group that has not been processed, the process returns to step S133. If there is no group that has not been processed, the transaction set dividing process is completed.

Figure 16:
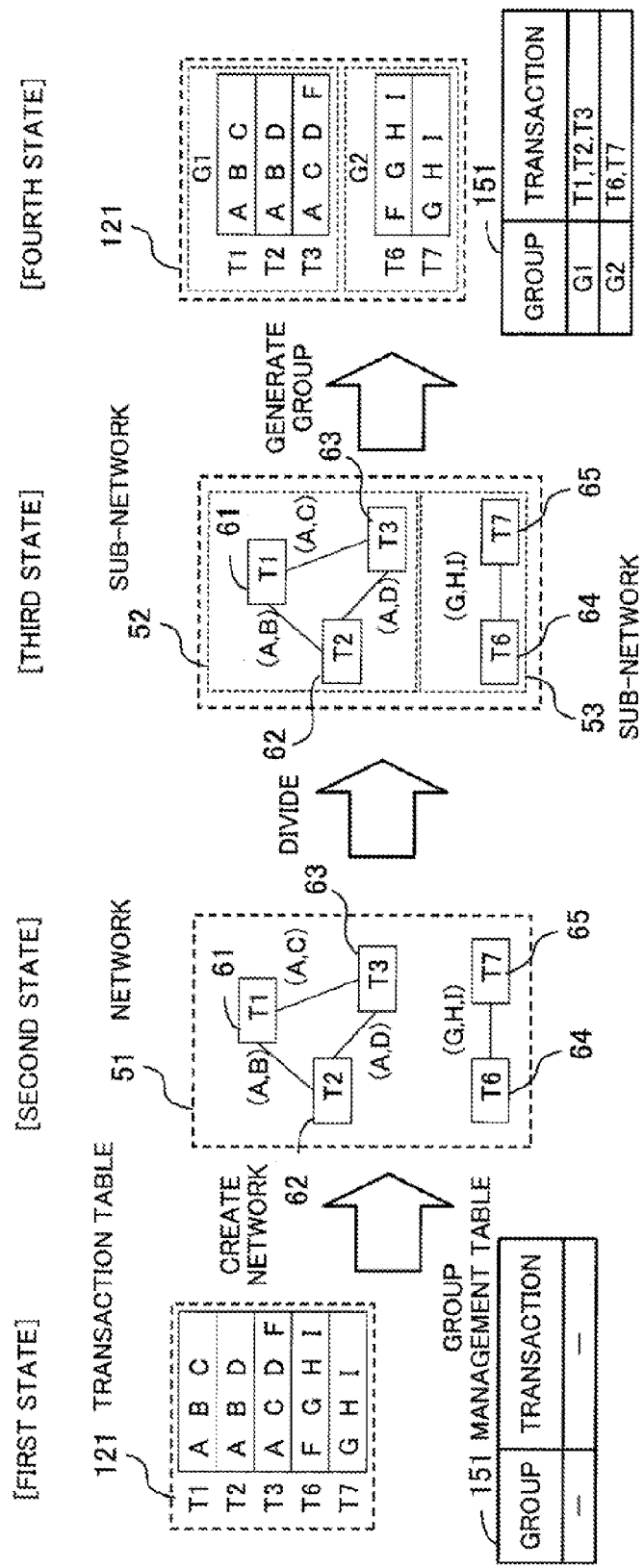
FIG. 16 illustrates an example of the transaction set dividing process.

FIG. 16 illustrates an example of the transaction set dividing process. A first state is an initial state of the transaction table 121 and group management table 151 at the time of starting the transaction set dividing process. The transaction table 121 in the first state has registered therein transaction data remaining after the first round of the maximum item set extraction process is performed. The group management table 151 has not registered therein any groups. In this case, the transaction set dividing process is performed on all the transaction data registered in the transaction table 121. In the transaction set dividing process, a network 51 is first created.

A second state indicates the created network 51. The network 51 is created by associating transaction data having in common n or more items with each other out of the transaction data currently in processing. In the network 51 illustrated in FIG. 16, the transaction data currently in processing is indicated by nodes 61 to 65, and associations between the transaction data are indicated by edges connecting between the nodes.

For example, the transaction data with transaction ID "T1" and transaction data with transaction ID "T2" have in common two items with item IDs "A" and "B". Therefore, the nodes 61 and 62 corresponding to these transaction data are connected by an edge. Similarly, the nodes 62 and 63 corresponding to the transaction data with transaction IDs "T2" and "T3" are connected by an edge. The nodes 61 and 63 corresponding to the transaction data with transaction IDs "T1" and "T3" are connected by an edge. The nodes 64 and 65 corresponding to the transaction data with transaction IDs "T6" and "T7" are connected by an edge.

Now, the nodes in the network 51 are divided into sub-networks 52 and 53 each including nodes connected by edges.

A third state is a state after the network 51 is divided into the sub-networks 52 and 53. The sub-network 52 includes the nodes 61, 62, and 63. The sub-network 53 includes the nodes 64 and 65.

In this connection, each node 61 to 63 in the sub-network 52 is associated with the other nodes. However, in the second embodiment, each node in the sub-network 52 which is associated with at least another node may belong to the same sub-network 52. For example, the node 63 is associated with two nodes 61 and 62 using edges, but even if the node 63 is not associated with the node 62, the node 63 belongs to the sub-network 52.

A fourth state is a state after groups are generated based on the sub-networks 52 and 53. The group management table 151 in the fourth state has registered therein a group of the transactions with transaction IDs "T1, T2, and T3", and a group of the transactions with transaction IDs "T6 and T7".

The fourth state of FIG. 16 is the same as the third state of FIG. 12. After the fourth state of FIG. 16, the maximum item set extraction process is performed in the same way as illustrated in FIG. 12.

By the way, the example of FIG. 12 is that a group is not further divided in the second round of the transaction set dividing process, and the maximum item sets of this time point are output. This is because threshold values that allow any data to be divided only once, which are k=2, m=2, and n=2, are used. In such threshold values, items which connect transaction data in the first round of the dividing process are included in at least two pieces of transaction data in a group. In addition, every transaction data in a group includes two or more items. Therefore, there is no transaction data or item that needs to be deleted in the second round of the maximum item set extraction process, and the group is no further divided.

In the case where threshold values k, m, and n are set to different values from those of the above example, a group may be further divided in the second or subsequent round of the transaction set dividing process.

Figure 17:
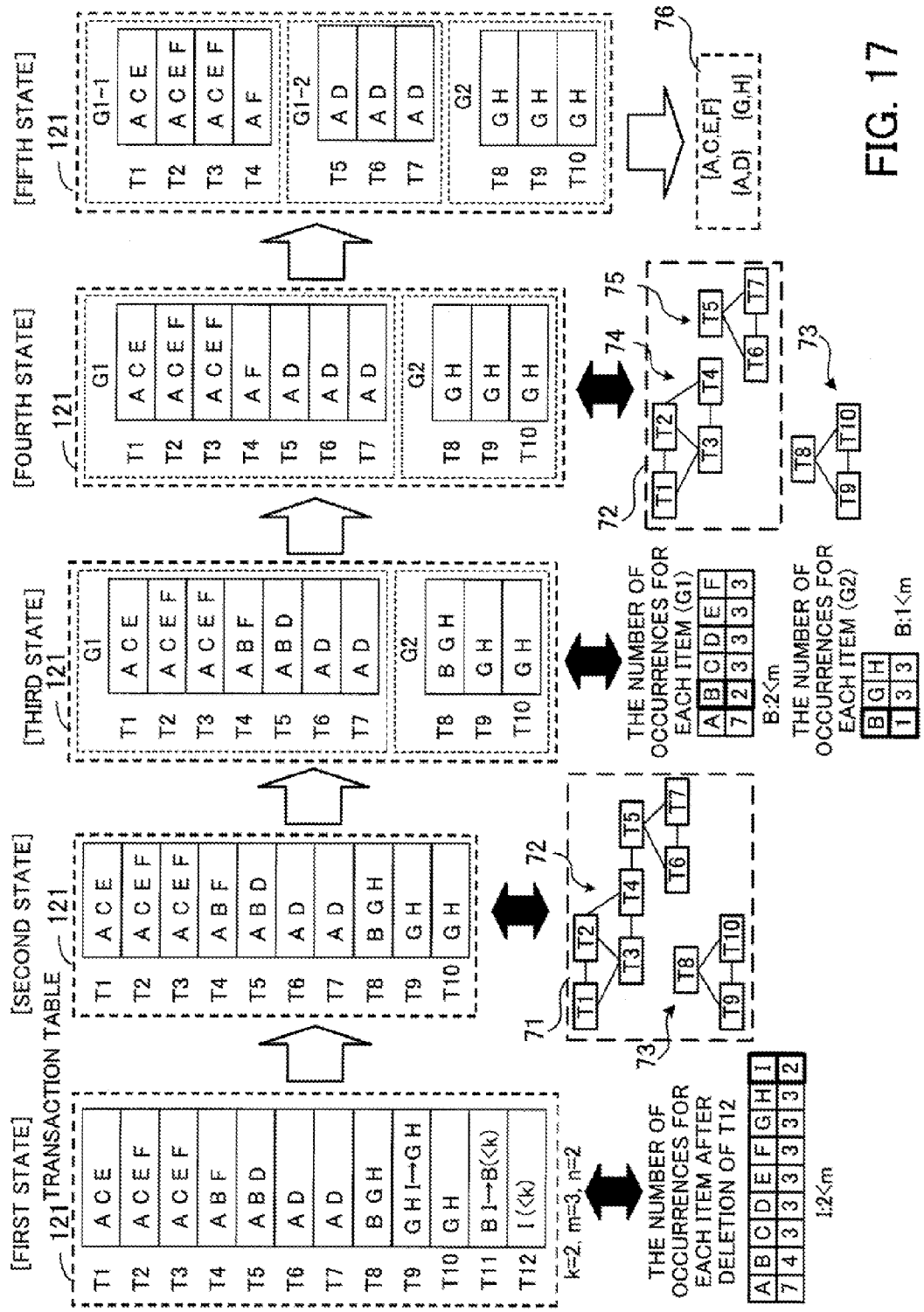
FIG. 17 illustrates an exemplary situation where a transaction set is divided a plurality of times.

FIG. 17 illustrates an exemplary situation where a transaction set is divided a plurality of times. In the example of FIG. 17, the threshold values k, m, and n are set to 2, 3, and 2, respectively. A first state is an initial state of the transaction table 121. Referring to the example of FIG. 17, 12 pieces of transaction data have been registered in the transaction table 121. In the first state, the maximum item set extraction process is performed. Referring to the example of FIG. 17, the transaction data with transaction ID "T12" has "1" item, less than the threshold value k(=2). Therefore, this transaction data is deleted.

By counting the number of occurrences for each item after the deletion of the transaction data with transaction ID "T12", the number of occurrences for the item with item ID "I" is counted as "2", less than the threshold value m(=3). Therefore, the item with item ID "I" is deleted from the transaction table 121. This reduces the number of items in the transaction data with transaction ID "T11" from "2" to "1", less than the threshold value k(=2). Therefore, this transaction data is deleted.

A second state is a state after the first round of the maximum item set extraction process is completed. In this maximum item set extraction process, the transaction data with transaction IDs "T11" and "T12" and the item with item ID "I" have been deleted from the transaction table 121. Then, the transaction set dividing process is performed with reference to the transaction table 121 in the second state.

A network 71 created by the transaction set dividing process is divided into two sub-networks 72 and 73. Therefore, a group is generated for each of the sub-networks 72 and 73. Referring to the example of FIG. 17, a group with group ID "G1" includes the transaction data with transaction IDs "T1, T2, T3, T4, T5, T6, and T7". In addition, a group with group ID "G2" includes the transaction data with transaction IDs "T8, T9, and T10".

A third state is a state after the first round of the transaction set dividing process is completed. In the third state, the second round of the maximum item set extraction process is performed. This second round of the maximum item set extraction process is performed for each group. By counting the number of occurrences for each item in the group with group ID "G1", the number of occurrences for the item with item ID "B" is counted as "2", less than the threshold value m(=3). Therefore, the item with item ID "B" is deleted from the transaction data of the transactions belonging to the group with group ID "G1". In addition, by counting the number of occurrences for each item in the group with group ID "G2", the number of occurrences for the item with item ID "B" is counted as "1", less than the threshold value m(=3). Therefore, the item with item ID "B" is deleted from the transaction data of the transactions belonging to the group with group ID "G2".

A fourth state is a state after the second round of the maximum item set extraction process is completed. In the fourth state, the second round of the transaction set dividing process is performed. Referring to the example of FIG. 17, the item with item ID "B" has been deleted from the transaction data of each group in the second round of the maximum item set extraction process. Therefore, the transaction data with transaction ID "T4" and the transaction data with transaction ID "T5" have in common the item with item ID "A" only. This means that these transaction data have "1" item in common, less than the threshold value n(=2). Therefore, the association between the transaction data with transaction ID "T4" and the transaction data with transaction ID "T5" is lost. As a result, the sub-network 72 created in the first round of the transaction set dividing process is further divided into two sub-networks 74 and 75. In this connection, the sub-network 73 is not further divided.

Then, a group is generated for each of the sub-network 73 to 75. Referring to the example of FIG. 17, a group with group ID "G1-1" includes the transaction data with transaction IDs "T1, T2, T3, and T4". A group with group ID "G1-2" includes the transaction data with transaction IDs "T5, T6, and T7". In addition, a group with group ID "G2" includes the transaction data with transaction IDs "T8, T9, and T10".

A fifth state is a state after the second round of the transaction set dividing process is completed. In the fifth state, the third round of the maximum item set extraction process is performed, but no transaction data or item is deleted. Therefore, there is no group to be further divided even if the second round of the transaction set dividing process is performed.

Therefore, the maximum item set 76 for each group, which is obtained with reference to the transaction table 121 in the fifth state, is output. Referring to the example of FIG. 17, the maximum item set {A, C, E, and F} is output based on the group with group ID "G1-1". The maximum item set {A and D} is output based on the group with group ID "G1-2". The maximum item set {G and H} is output based on the group with group ID "G2".

As described above, maximum item sets satisfying the "conditions 1" and "conditions 2" are obtained. According to the second embodiment, the efficient operations are performed in the process of obtaining the maximum item sets. The following describes computational complexity according to the second embodiment. In the following description, the computational complexity is represented in big-O notation.

(Computational Complexity of Maximum Item Set Extraction Process)

Assume that the number of all items is N (N is an integer of 1 or greater), and the number of all transactions is M (M is an integer of 1 or greater).

In the first round of the maximum item set extraction process, the number of items included in all transactions is calculated. The computational complexity of this process is $O(M)$.

Then, the number of transactions of all items is calculated. The computational complexity of this process is $O(N)$.

The computational complexity of these repetitive processes is overestimated as $O(M+N)$.

Therefore, the computational complexity of the maximum item set extraction process is $O(M+N)$.

(Computational Complexity of Transaction Set Dividing Process)

The computational complexity of the transaction set dividing process is equal to that of the Connected Component extraction algorithm disclosed in the previously-mentioned literature, J. Hoperoft, R. Tarjan, "*Efficient algorithms for graph manipulation*", i.e., $O(M+N)$.

Therefore, the computational complexity of the maximum item set extraction process and the transaction set dividing process is $O(M+N)$.

In the second embodiment, the maximum item set extraction process and the transaction set dividing process are repeated until groups of transactions are not further divided. Therefore, the total computational complexity are overestimated as $O((M+N)+(M+N-1)+ \ldots +1)=O((M+N)^2)$.

On the other hand, in the case of obtaining maximum item sets satisfying the "conditions 1" and "conditions 2" without using the technique of the second embodiment, every different combination of items are checked to determine whether the combination satisfies the "conditions 1" and "conditions 2". The computational complexity for this case is $O(M \times 2^N)$.

When N is a large number, the computational complexity $O((M+N)^2)$ for the case of using the technique of the second embodiment is significantly smaller than the computational complexity $O(M \times 2^N)$ for the case of not using the technique of the second embodiment. That is, a greater number of items N enhance the efficiency of the process using the technique of the second embodiment.

Using the maximum item sets output as described above makes it possible to create a menu listing items useful for as many customers as possible, for example. Further, the items listed in the menu are likely to be ordered together by customers who tend to order the same items. Therefore, each customer can check a menu listing items that were ordered by customers who had similar tastes to him/her.

Further, according to the second embodiment, a maximum item set is extracted for each group. The extracted maximum item sets tend to be used by customers who have different tastes. For example, different menus created based on a plurality of extracted maximum item sets are very useful for customer groups that have different tastes. For example, menus according to customers' tastes, such as a menu for a group of customers who like spicy food and a menu for a group of customers who prefer low-calorie food, are created.

(C) Other Embodiments

The above processing functions can be realized by using a computer. In this case, a program is prepared, which describes processes for the functions of the server 100. A computer realizes the above processing functions by executing the program. The program describing the intended processes may be recorded on a computer-readable recording medium. Computer-readable recording media include magnetic recording devices, optical discs, magneto-optical recording media, semiconductor memories, etc. The magnetic recording devices include Hard Disk Drives (HDD), Flexible Disks (FD), Magnetic Tapes (MT), etc. The optical discs include DVDs, DVD-RAMS, CD-ROM/RW, etc. The magneto-optical recording media include MOs (Magneto-Optical disk), etc. In this connection, the recording media do not include transitory propagating signals per se.

To distribute the program, portable recording media, such as DVDs and CD-ROMs, on which the program is recorded, may be put on sale. Alternatively, the program may be stored in the storage device of a server computer and may be transferred from the server computer to other computers through a network.

A computer which is to execute the above program stores in its local storage device the program recorded on a portable recording medium or transferred from the server computer, for example. Then, the computer reads the program from the local storage device, and runs the program. The computer may run the program directly from the portable recording medium. Also, while receiving the program being transferred from the server computer, the computer may sequentially run this program.

In addition, the processing functions may also be implemented wholly or partly by using a digital signal processor (DSP), application-specific integrated circuit (ASIC), programmable logic device (PLD), or other electronic circuits.

According to the embodiments, it is possible to efficiently extract a plurality of elements that are included together in many of a plurality of sets associated with each other in terms of commonality of elements.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. An information processing apparatus comprising a processor configured to perform a procedure including:

(a) deleting, from a plurality of sets each including at least one element and stored in a storage unit, a set having less than a threshold number of included elements and an element existing in only sets whose number is less than a threshold number of occurrences repeatedly and alternately until there is no set or element that needs to be deleted;

(b) generating, out of sets remaining in the storage unit after the deleting of the set and element, a group to which sets associated with each other in terms of commonality of elements belong;

(c) deleting, with respect to each of generated groups stored in the storage unit, a set having less than the threshold number of included elements and an element existing in only sets whose number in a same group is less than the threshold number of occurrences, from the sets belonging to said each group repeatedly and alternately until there is no set or element that needs to be deleted; and (d) outputting a list of elements included in sets remaining in said each group subjected to the deleting of the set and element.

2. The information processing apparatus according to claim 1, wherein the generating of the group associates sets having in common at least a threshold number of common elements with each other, out of the sets remaining in the storage unit after the deleting of the set and element, and generating the group to which a plurality of linked sets obtained by tracking the associated sets belong.

3. The information processing apparatus according to claim 1, wherein:

the procedure further includes associating sets with each other in terms of commonality of elements out of the sets remaining in said each group subjected to the deleting of the set and element, and when a plurality of associated sets forms part of the sets remaining in said each group, generating another group to which the plurality of associated sets belong; and the outputting outputs the list of the elements included in the sets remaining in said each group in a case where said another group is not generated from said each group subjected to the deleting of the set and element.

4. The information processing apparatus according to claim 3, wherein the generating of said another group associates sets having in common at least a threshold number of common elements with each other, out of the sets remaining in said each group subjected to the deleting of the set and element, and when a plurality of linked sets obtained by tracking the associated sets forms part of the sets remaining in said each group, generates said another group to which the plurality of linked sets belong.

5. The information processing apparatus according to claim 1, wherein elements are items to be traded, and sets are transactions including items traded together.

6. A computer-readable recording medium storing a computer program, the computer program causing a computer to perform a procedure comprising:

deleting, from a plurality of sets each including at least one element and stored in a storage unit, a set having less than a threshold number of included elements and an element existing in only sets whose number is less than a threshold number of occurrences repeatedly and alternately until there is no set or element that needs to be deleted;

generating, out of sets remaining in the storage unit after the deleting of the set and element, a group to which sets associated with each other in terms of commonality of elements belong;

deleting, with respect to each of generated groups stored in the storage unit, a set having less than the threshold number of included elements and an element existing in only sets whose number in a same group is less than the threshold number of occurrences, from the sets belonging to said each group repeatedly and alternately until there is no set or element that needs to be deleted; and outputting a list of elements included in sets remaining in said each group subjected to the deleting of the set and element.

7. An element extraction method comprising:

deleting, by a processor, a set having less than a threshold number of included elements and an element existing in only sets whose number is less than a threshold number of occurrences, from a plurality of sets each including at least one element and stored in a storage unit repeatedly and alternately until there is no set or element that needs to be deleted;

generating, by the processor, a group to which sets associated with each other in terms of commonality of elements belong, out of sets remaining in the storage unit after the deleting of the set and element;

deleting, by the processor, with respect to each of generated groups stored in the storage unit, a set having less than the threshold number of included elements and an element existing in only sets whose number in a same group is less than the threshold number of occurrences, from the sets belonging to said each group repeatedly and alternately until there is no set or element that needs to be deleted; and outputting a list of elements included in sets remaining in said each group subjected to the deleting of the set and element.

* * * * *